US012333879B2

(12) United States Patent
Kudoor et al.

(10) Patent No.: US 12,333,879 B2
(45) Date of Patent: Jun. 17, 2025

(54) DOOR LOCK REMOTE CALIBRATION

(71) Applicant: SimpliSafe, Inc., Boston, MA (US)

(72) Inventors: Harsha Kudoor, Arlington, MA (US);
Kensly Plimouth, Boston, MA (US);
Ali Tawbeh, Franklin, MA (US); David
Atkins, Lexington, MA (US)

(73) Assignee: SimpliSafe, Inc., Boston, MA (US)

( * ) Notice: Subject to any disclaimer, the term of this
patent is extended or adjusted under 35
U.S.C. 154(b) by 0 days.

(21) Appl. No.: 18/744,402

(22) Filed: Jun. 14, 2024

(65) Prior Publication Data
US 2025/0140045 A1 May 1, 2025

Related U.S. Application Data

(60) Provisional application No. 63/594,329, filed on Oct. 30, 2023.

(51) Int. Cl.
G07C 9/00 (2020.01)

(52) U.S. Cl.
CPC ..... G07C 9/00817 (2013.01); G07C 9/00571 (2013.01); G07C 2009/00825 (2013.01); G07C 2009/00841 (2013.01)

(58) Field of Classification Search
CPC ............ G07C 9/00817; G07C 9/00571; G07C 2009/00825; G07C 2009/00841; G07C 9/00
USPC .................................. 340/5.2, 5.7, 7.31, 7.44
See application file for complete search history.

(56) References Cited

U.S. PATENT DOCUMENTS

| 7,622,895 | B1 * | 11/2009 | Griffin | .................. | H02J 7/0049 |
| | | | | | 320/132 |
| 9,057,210 | B2 * | 6/2015 | Dumas | ............... | G07C 9/00309 |
| 9,704,318 | B2 * | 7/2017 | Zakaria | ............. | G07C 9/00571 |
| 9,721,413 | B2 * | 8/2017 | Dumas | ............... | G07C 9/00309 |
| 9,781,395 | B2 * | 10/2017 | Ishikawa | ............. | H04N 9/3185 |
| 9,818,247 | B2 * | 11/2017 | Johnson | .................. | G07C 9/23 |

(Continued)

FOREIGN PATENT DOCUMENTS

CN 111899380 A 11/2020
CN 112348997 A 2/2021

OTHER PUBLICATIONS

European Search Report issued Mar. 20, 2025 for EP Application No. 24208748.4.

Primary Examiner — Nam V Nguyen
(74) Attorney, Agent, or Firm — Pierce Atwood LLP

(57) ABSTRACT

A computing system may be used for remotely calibrating a door lock. The system includes an application executable on a user device, a remote computing environment in communication with the user device, and a base station in communication with the remote computing environment and the door lock. The application allows a user to initiate calibration of the door lock in response to input on the user interface. The remote computing environment exchanges data with the user device to calibrate the door lock. The base station initiates calibration of the door lock and notifies the remote computing environment of the calibration status. By leveraging communication between the application, remote computing environment, and base station, the system allows reliable remote calibration of the door lock without requiring close physical proximity between the mobile device and the lock.

17 Claims, 11 Drawing Sheets

(56) References Cited

U.S. PATENT DOCUMENTS

| | | | |
|---|---|---|---|
| 10,402,121 B2* | 9/2019 | Notani | G06F 3/0683 |
| 11,804,912 B2* | 10/2023 | Walker | H04B 17/21 |
| 11,977,676 B2* | 5/2024 | Nicholson | G02B 27/0093 |
| 12,067,855 B2* | 8/2024 | Abueshsheikh | G08B 25/08 |
| 2013/0154823 A1* | 6/2013 | Ostrer | G08B 29/22 |
| | | | 340/539.1 |
| 2014/0077929 A1* | 3/2014 | Dumas | G07C 9/00571 |
| | | | 340/5.61 |
| 2016/0350988 A1 | 12/2016 | Malhotra | |
| 2016/0353239 A1* | 12/2016 | Kjellsson | G07C 9/00309 |
| 2018/0087793 A1 | 3/2018 | Okita et al. | |
| 2022/0038251 A1* | 2/2022 | Runyon | H04W 24/08 |

* cited by examiner

DOOR LOCK REMOTE CALIBRATION

CROSS-REFERENCE TO RELATED APPLICATION

This patent application claims the benefit under 35 U.S.C. § 119(e) of U.S. Provisional Patent Application Ser. No. 63/594,329, entitled DOOR LOCK REMOTE CALIBRATION, filed Oct. 30, 2023, which is incorporated by reference herein in its entirety.

BACKGROUND

Electromechanical door locks are locked, unlocked, and monitored using a smartphone app, allowing keyless and remote access control.

BRIEF DESCRIPTION OF THE DRAWINGS

In some aspects, the techniques described herein relate to a system including: an application executable on a user device to operate a door lock and to initiate calibration of the door lock remotely in response to input received on a user interface of the application presented on a display of the user device; a remote computing environment in communication with the user device, the remote computing environment configured to exchange data with the user device to calibrate the door lock; and a base station in communication with the remote computing environment, the base station configured to initiate calibration of the door lock and notify the remote computing environment of a calibration status.

In some aspects, the techniques described herein relate to a non-transitory computer-readable medium storing instructions that, when executed by a processor of a user device, cause the user device to: generate a request to calibrate a door lock in response to a user input received via a user interface; and transmit the request to calibrate the door lock indirectly to the door lock via a remote computing environment and a base station in communication with the door lock, the request to calibrate the door lock causing the door lock to initiate calibration of the door lock.

In some aspects, the techniques described herein relate to a computing device including: a memory; and a processor coupled to the memory and configured to execute instructions to: receive a request from a remote computing environment to initiate calibration of a door lock, the request including an identifier of the door lock; transmit a signal to the door lock based on the identifier, the signal to initiate calibration of the door lock; receive a return signal from the door lock indicative of a status of calibration of the door lock; and provide a message indicative of the status of calibration via the remote computing environment to a user device remote from the door lock to confirm calibration of the door lock.

Additional examples of the disclosure, as well as features and advantages thereof, will become more apparent by reference to the description herein taken in conjunction with the accompanying drawings which are incorporated in and constitute a part of this disclosure. The figures are not necessarily drawn to scale.

Figure 1:
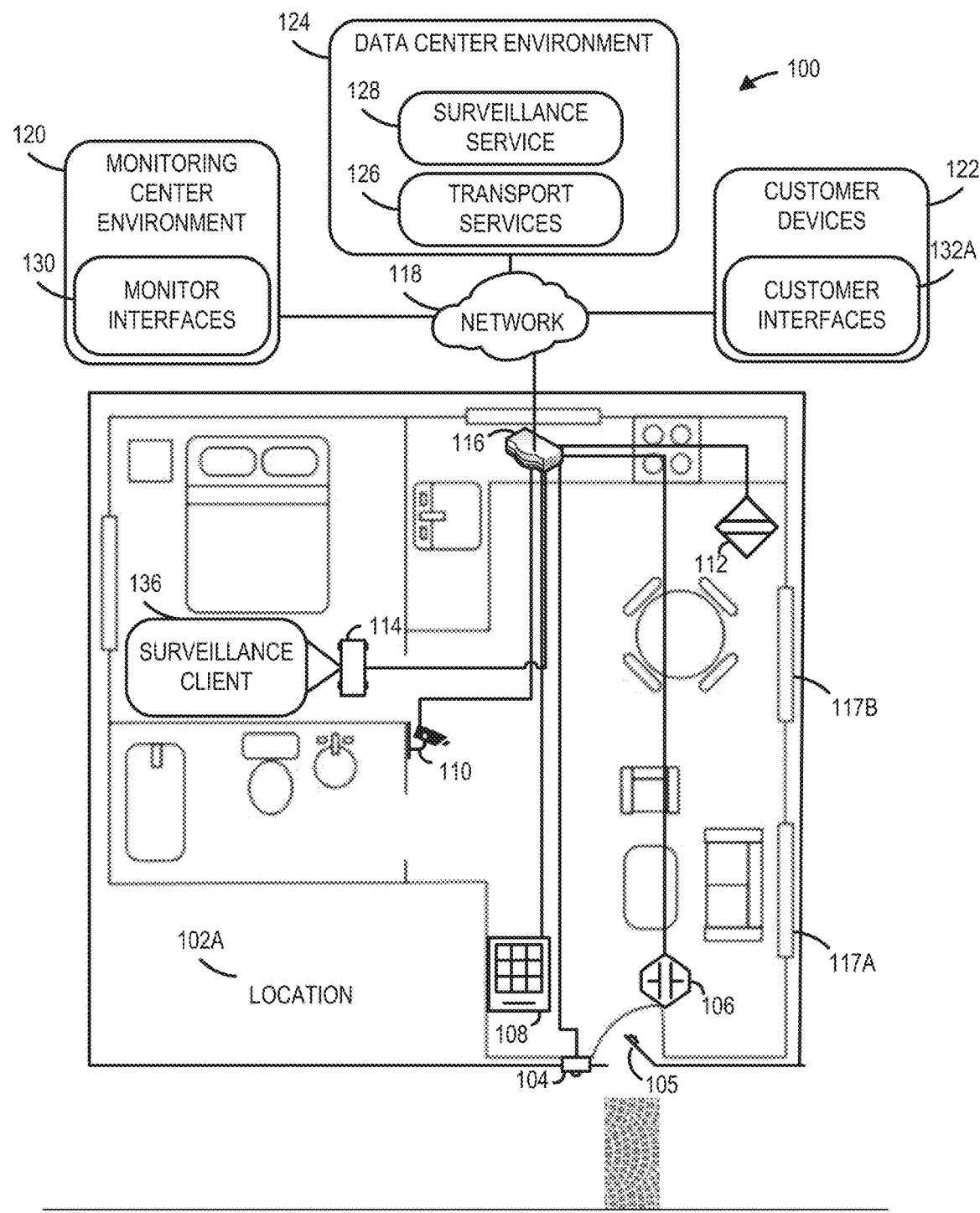

FIG. 1 is a schematic diagram of a security system, in accordance with some examples.

Figure 2:
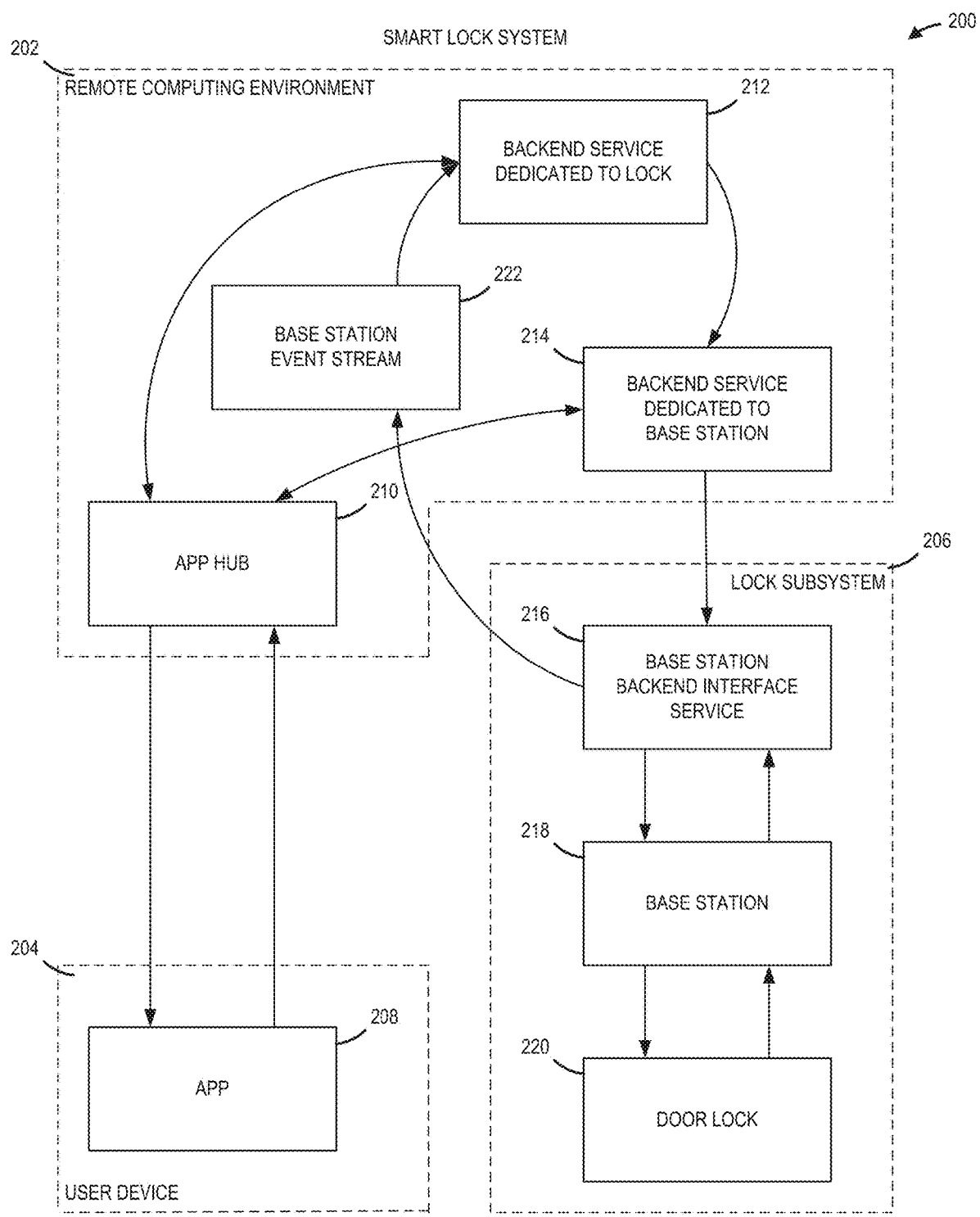

FIG. 2 is a schematic diagram of a smart lock system, in accordance with some examples.

Figure 3:
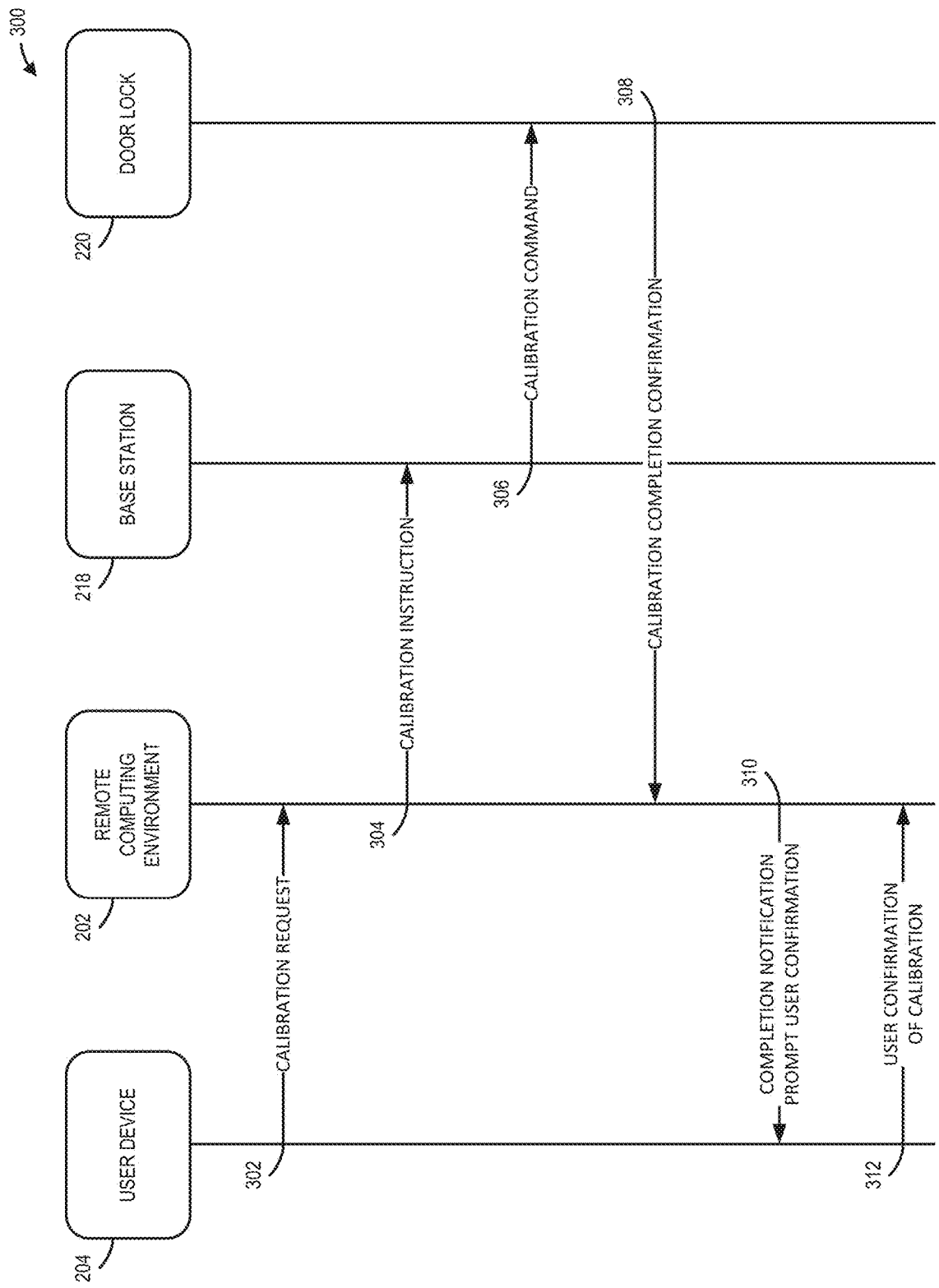

FIG. 3 is a sequence diagram of a smart lock process, in accordance with some examples.

Figure 4:
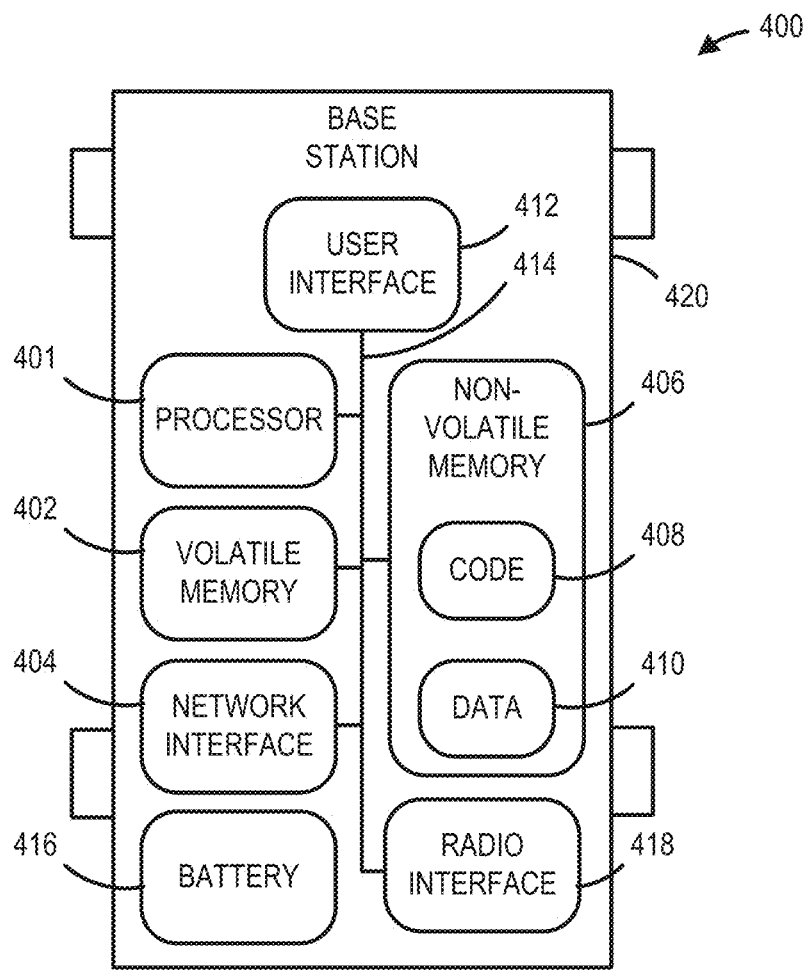

FIG. 4 is a schematic diagram of an example base station, in accordance with some examples.

Figure 5:
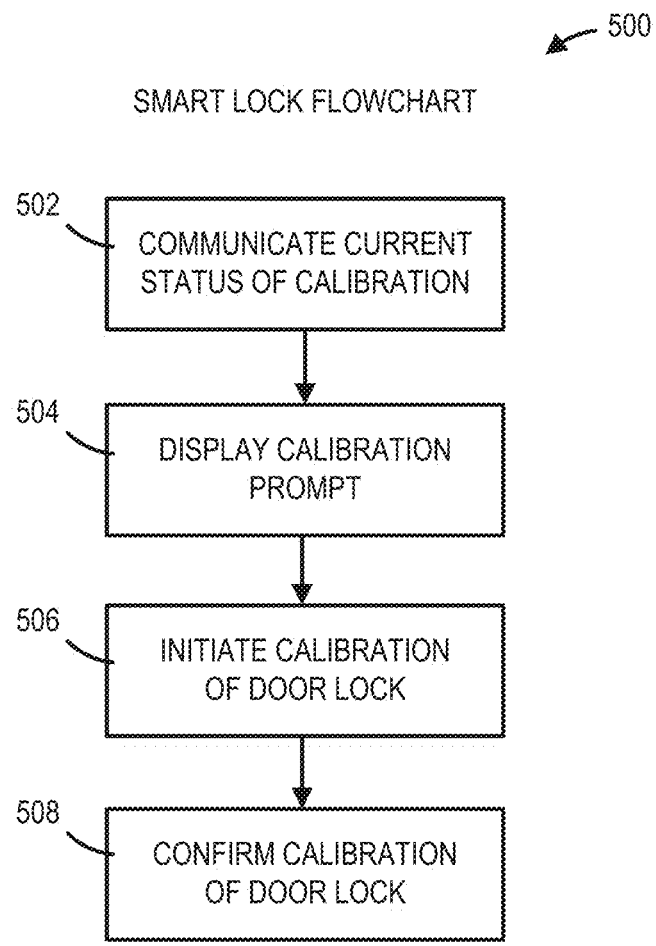

FIG. 5 is a schematic diagram of an example smart lock flowchart, in accordance with some examples.

Figure 6:
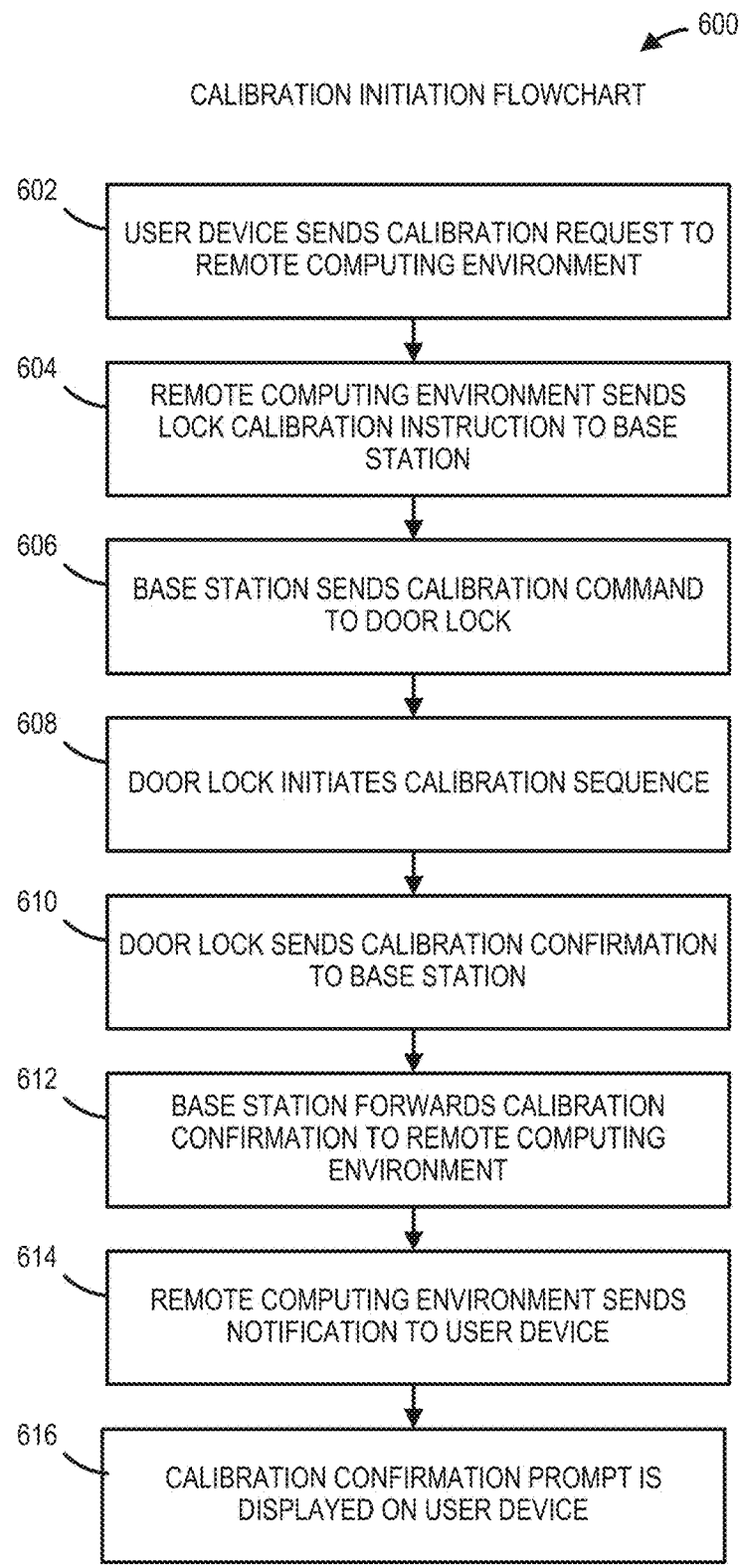

FIG. 6 is a schematic diagram of an example calibration initiation flowchart, in accordance with some examples.

Figure 7:
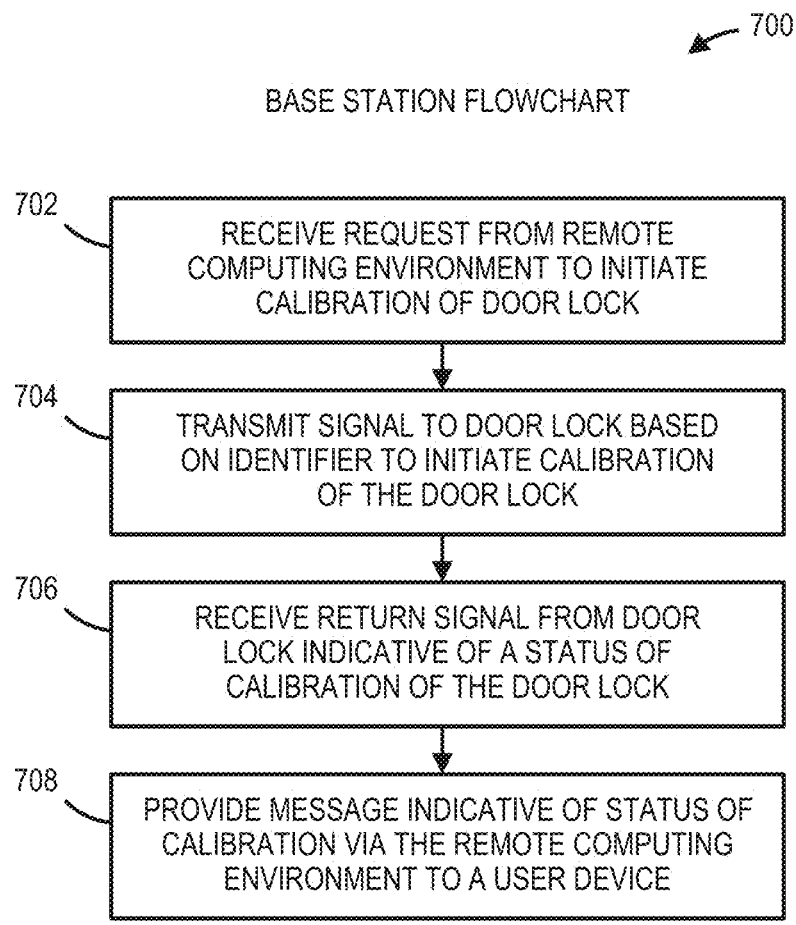

FIG. 7 is a schematic diagram of an example base station flowchart, in accordance with some examples.

Figure 8:
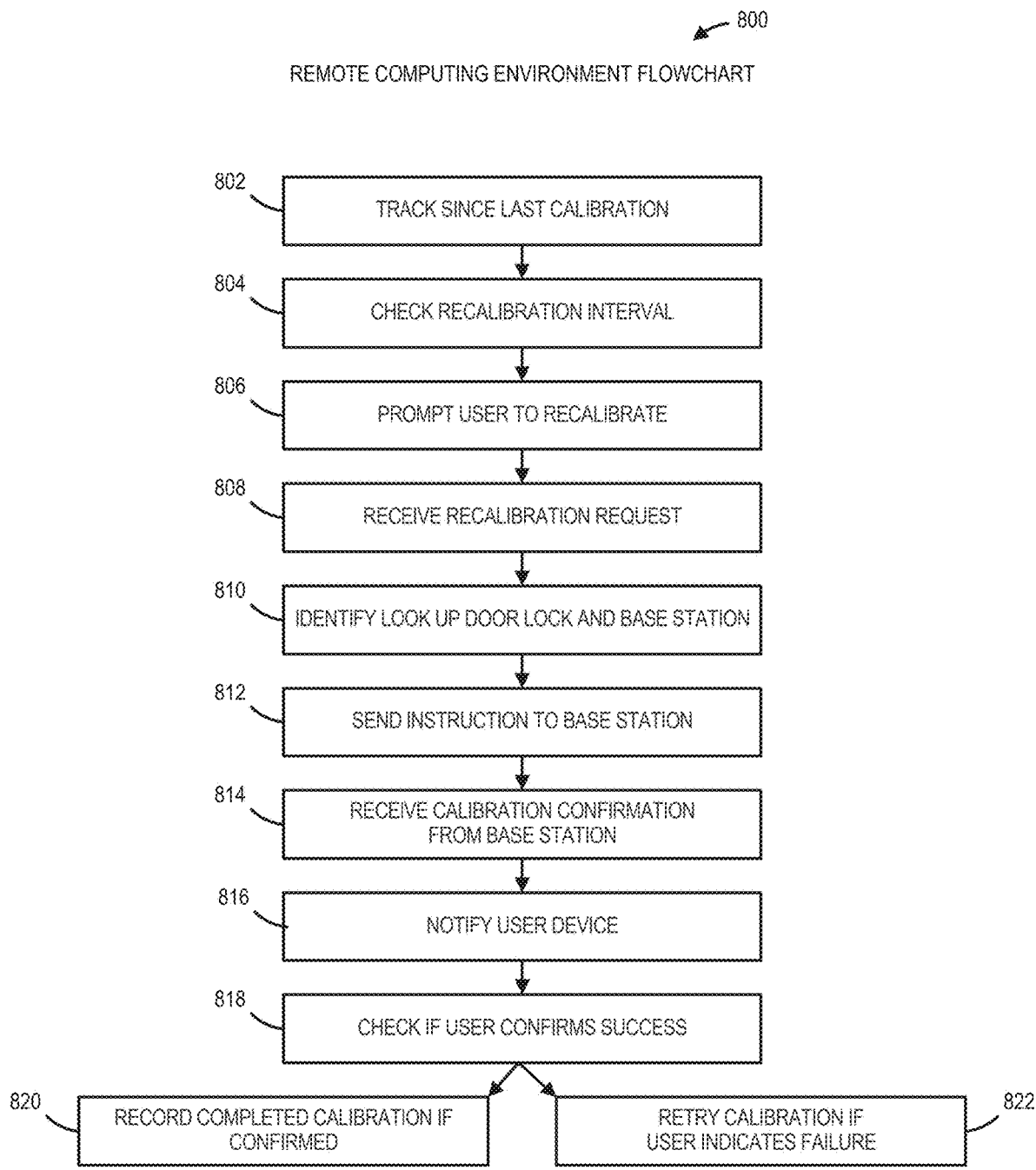

FIG. 8 is a schematic diagram of an example remote computing environment, in accordance with some examples.

Figure 9:
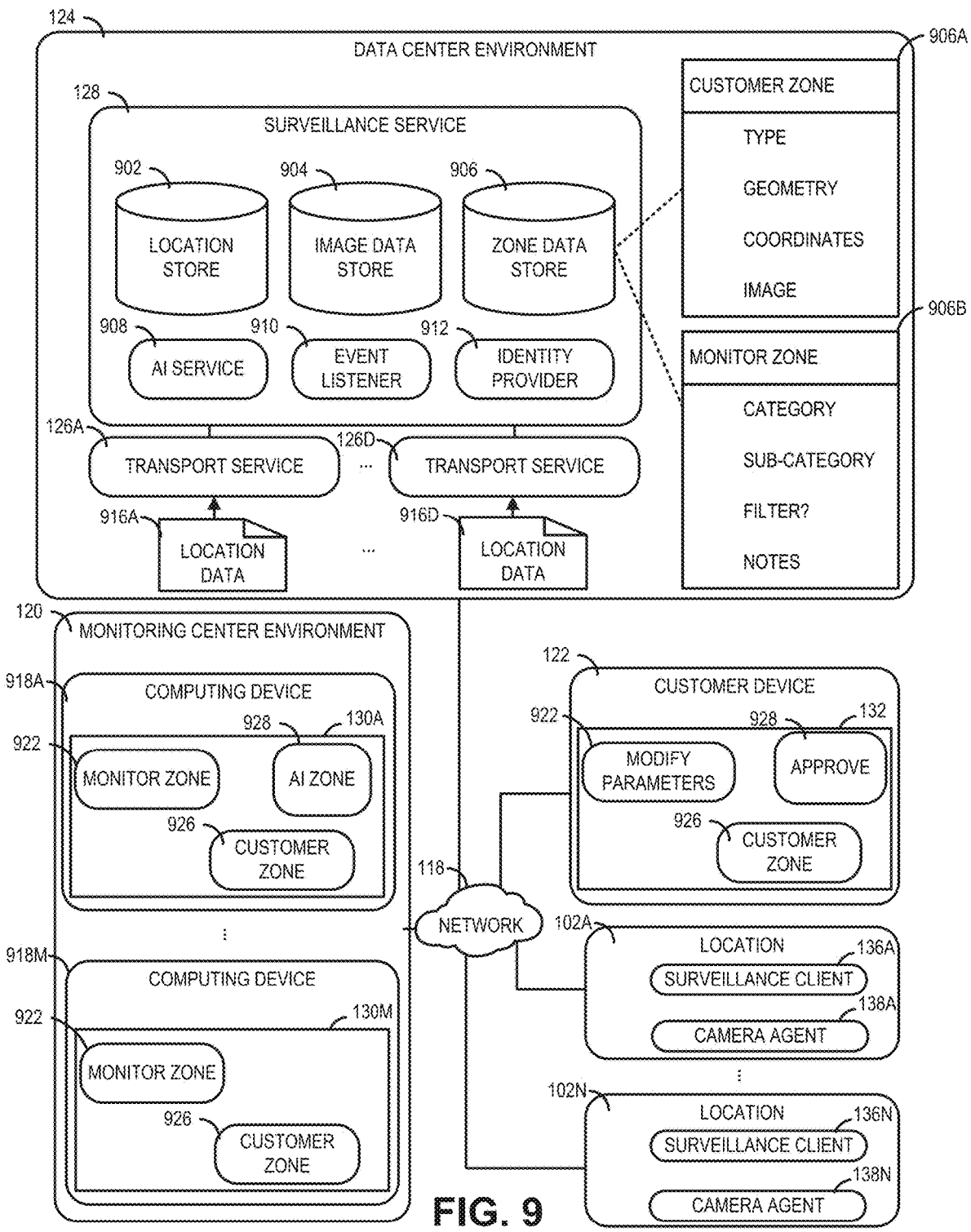

FIG. 9 is a schematic diagram of an example cloud computing system, in accordance with some examples.

Figure 10:
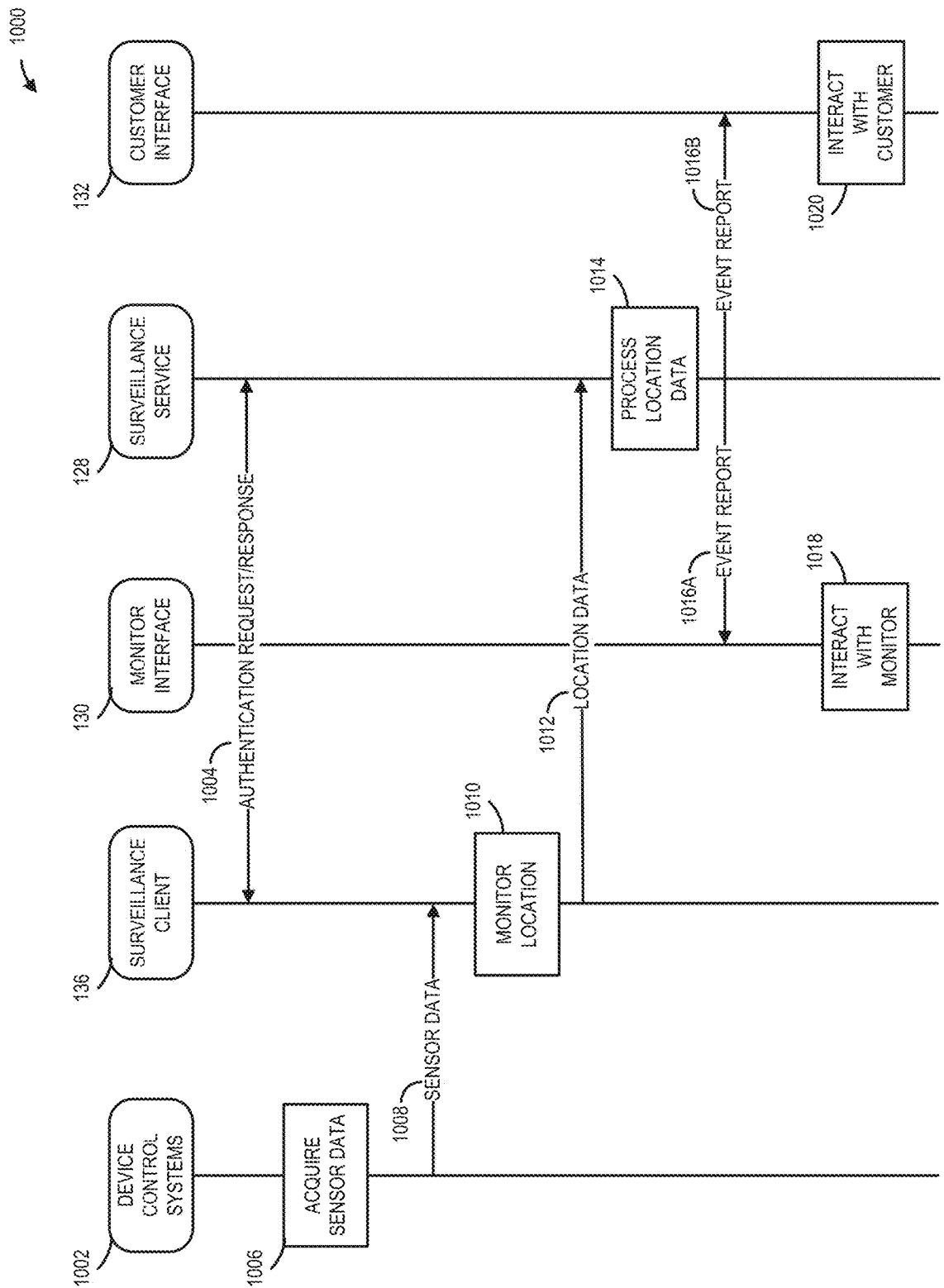

FIG. 10 is a sequence diagram of an example cloud monitoring process, in accordance with some examples.

Figure 11:
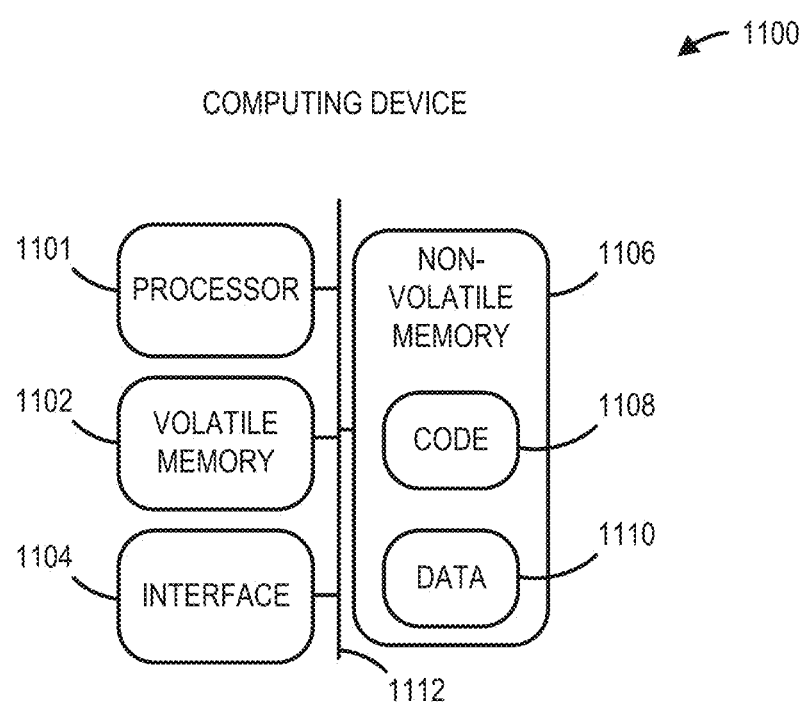

FIG. 11 is a schematic diagram of an example computing device, in accordance with some examples.

DETAILED DESCRIPTION

For the purposes of promoting an understanding of the principles of the present disclosure, reference will now be made to the examples illustrated in the drawings, and specific language will be used to describe the same. It will nevertheless be understood that no limitation of the scope of the examples described herein is thereby intended.

Smart locks may be calibrated upon installation and recalibrated periodically to provide reliable operation of the smart lock. This recalibration may be used to reduce or minimize reductions in lock functionality, such as functionality changes over time by periodic drift caused by mechanism age or changes in battery voltage. Some smart locks may use a direct Bluetooth connection for communication between the mobile device and the lock for lock calibration.

Conventional smart lock systems have some technical limitations related to their use of direct Bluetooth or other direct communication between the mobile device and the lock. The use of direct communication requires close physical proximity to recalibrate, which often requires the mobile device to be present at or otherwise located near the lock (e.g., within Bluetooth range). This range limitation prevents any ability to recalibrate remotely (e.g., at a distance greater than the Bluetooth range). Conventional systems thus require that the mobile device always be present during calibration of the lock, but that may not always be convenient or possible. Some personal computing devices may lack the relevant radio capabilities, such as a desktop computer that does not have a Bluetooth connection. People who travel frequently may find themselves away from home with the mobile device used for calibration, but other members of their family may experience trouble with an out-of-calibration lock without access to the calibration mobile device. Further, if there is a failure of the lock to operate due to improper calibration, then a manual operation of the lock (e.g., using a key) may be required to secure the premises. This could be problematic for people who are given temporary but not permanent access (e.g., a housekeeper or vacation renters with a temporary access code), who may not have a physical key or the calibrating mobile device to recalibrate the door lock. Solutions that rely on direct communication between a mobile device and a smart lock may place constraints on smart lock recalibration, such as proximity, compatibility, reliability, and security constraints.

The present subject matter provides technical solutions addressing technical problems associated with direct communication solutions. These technical solutions use a cloud-based remote computing environment for communication between the mobile device and the lock, which provides advantages over direct communication solutions. First, these technical solutions remove proximity constraints by allowing the mobile device to be beyond Bluetooth range or even on a different network than the lock. Second, these technical solutions improve reliability by using cloud servers rather than direct device links that may fail. Third, these technical solutions enable full lifecycle management through the mobile app, allowing status monitoring, reminders, and recalibration prompts. Fourth, these technical solutions leverage IP-based networking between the mobile device, cloud, and base station, rather than requiring local direct device-to-device connectivity. Overall, these technical solutions provide more flexible, reliable, and capable communication between the mobile device and lock compared to direct communication alone.

FIG. 1 is a schematic diagram of a security system 100, in accordance with some examples. FIG. 1 is a schematic diagram of a security system 100 configured to establish and use zones in accordance with some examples. As shown in FIG. 1, the system 100 includes a monitored location 102A, a monitoring center environment 120, a data center environment 124, one or more customer devices 122, and a communication network 118. Each of the monitored location 102A, the monitoring center environment 120, the data center 124, the one or more customer devices 122, and the communication network 118 include one or more computing devices (e.g., as described below with reference to FIG. 11). The one or more customer devices 122 are configured to host one or more customer interface applications 132. The monitoring center environment 120 is configured to host one or more monitor interface applications 130. The data center environment 124 is configured to host a surveillance service 128 and one or more transport services 126. The location 102A includes image capture devices 104 and 110, a smart door lock 105, a contact sensor assembly 106, a keypad 108, a motion sensor assembly 112, a base station 114, and a router 116. The base station 114 hosts a surveillance client 136.

In some examples, the router 116 is a wireless router that is configured to communicate with the devices disposed in the location 102A (e.g., devices 104, 105, 106, 108, 110, 112, and 114) via communications that comport with a communications standard such as any of the various Institute of Electrical and Electronics Engineers (IEEE) 108.11 standards. As illustrated in FIG. 1, the router 116 is also configured to communicate with the network 118. It should be noted that the router 116 implements a local area network (LAN) within and proximate to the location 102A by way of example only. Other networking technology that involves other computing devices is suitable for use within the location 102A. For instance, in some examples, the base station 114 can receive and forward communication packets transmitted by the image capture device 110 via a point-to-point personal area network (PAN) protocol, such as Bluetooth. Other wired, wireless, and mesh network technology and topologies will be apparent with the benefit of this disclosure and are intended to fall within the scope of the examples disclosed herein.

Continuing with the example of FIG. 1, the network 118 can include one or more public and/or private networks that support, for example, internet protocol (IP). The network 118 may include, for example, one or more LANs, one or more PANs, and/or one or more wide area networks (WANs). The LANs can include wired or wireless networks that support various LAN standards, such as a version of IEEE 108.11 and the like. The PANs can include wired or wireless networks that support various PAN standards, such as Bluetooth, Zigbee, and the like. The WANs can include wired or wireless networks that support various WAN standards, such as Code Division Multiple Access (CDMA), Global System for Mobiles (GSM), and the like. The network 118 connects and enables data communication between the computing devices within the location 102A, the monitoring center environment 120, the data center environment 124, and the customer devices 122. In at least some examples, both the monitoring center environment 120 and the data center environment 124 include network equipment (e.g., similar to the router 116) that is configured to communicate with the network 118 and computing devices collocated with or near the network equipment.

Continuing with the example of FIG. 1, the data center environment 124 can include physical space, communications, cooling, and power infrastructure to support networked operation of computing devices. For instance, this infrastructure can include rack space into which the computing devices are installed, uninterruptible power supplies, cooling plenum and equipment, and networking devices. The data center environment 124 can be dedicated to the security system 100, can be a non-dedicated, commercially available cloud computing service (e.g., Microsoft Azure, Amazon Web Services, Google Cloud, or the like), or can include a hybrid configuration made up of dedicated and non-dedicated resources. Regardless of its physical or logical configuration, as shown in FIG. 1, the data center environment 124 is configured to host the surveillance service 128 and the transport services 126.

Continuing with the example of FIG. 1, the monitoring center environment 120 can include a plurality of computing devices (e.g., desktop computers) and network equipment (e.g., one or more routers) connected to the computing devices and the network 118. The customer devices 122 can include personal computing devices (e.g., a desktop computer, laptop, tablet, smartphone, or the like) and network equipment (e.g., a router, cellular modem, cellular radio, or the like). As illustrated in FIG. 1, the monitoring center environment 120 is configured to host the monitor interfaces 130 and the customer devices 122 are configured to host the customer interfaces 132.

Continuing with the example of FIG. 1, the devices 104, 106, 110, and 112 are configured to acquire analog signals via sensors incorporated into the devices, generate digital sensor data based on the acquired signals, and communicate (e.g., via a wireless link with the router 116) the sensor data to the base station 114. The type of sensor data generated and communicated by these devices varies along with the type of sensors included in the devices. For instance, the image capture devices 104 and 110 can acquire ambient light, generate frames of image data based on the acquired light, and communicate the frames to the base station 114, although the pixel resolution and frame rate may vary depending on the capabilities of the devices. In some examples, the image capture devices 104 and 110 can also receive and store filter zone configuration data and filter the frames using one or more filter zones prior to communicating the frames to the base station 114. As shown in FIG. 1, the image capture device 104 has an FOV that originates proximal to a front door of the location 102A and can acquire images of a walkway, highway, and a space between the location 102A and the highway. The image capture device 110 has an FOV that originates proximal to a bathroom of the location 102A and can acquire images of a living room and dining area of the location 102A. The image capture device 110 can further acquire images of outdoor areas beyond the location 102A through windows 117A and 117B on the right side of the location 102A.

Continuing with the example of FIG. 1, smart door lock 105 may include an electromechanical door lock that may be locked, unlocked, and monitored remotely (e.g., without requiring a direct PAN connection). The smart door lock 105 may connect to the base station 114. The base station 114 acts as a hub for the smart door lock 105, relaying commands between the smart door lock 105, the data center environment 124, and any customer devices 122. For example, when a user wants to unlock the door, they may open a customer interface 132 (e.g., an application) running on customer devices 122 and send a command to unlock the smart door lock 105. The unlock command may be transmitted over the internet to the base station 114. The base station 114 may then relay the unlock command via a wireless radio frequency (RF) signal to the smart door lock 105, instructing the smart door lock 105 to unlock. The smart door lock 105 may then send a confirmation message back to the base station 114 when the unlock actions are completed. The base station 114 may also monitor the smart door lock 105 in real-time, such as to monitor lock status, battery level, and other metrics. The base station 114 may report this information back to the customer interface 132 on demand for the user to view. The base station 114 may provide the centralized connectivity and intelligence to enable remote control of the smart door lock 105, allowing control of the lock from anywhere using the customer interface 132. Further examples of the functionality of the smart door lock 105 are described below with reference to FIGS. 2-11.

Continuing with the example of FIG. 1, the contact sensor assembly 106 includes a sensor that can detect the presence or absence of a magnetic field generated by a magnet when the magnet is proximal to the sensor. When the magnetic field is present, the contact sensor assembly 106 generates Boolean sensor data specifying a closed state. When the magnetic field is absent, the contact sensor assembly 106 generates Boolean sensor data specifying an open state. In either case, the contact sensor assembly 106 can communicate sensor data indicating whether the front door of the location 102A is open or closed to the base station 114. The motion sensor assembly 112 can include an audio emission device that can radiate sound (e.g., ultrasonic) waves and an audio sensor that can acquire reflections of the waves. When the audio sensor detects the reflection because no objects are in motion within the space monitored by the audio sensor, the motion sensor assembly 112 generates Boolean sensor data specifying a still state. When the audio sensor does not detect a reflection because an object is in motion within the monitored space, the motion sensor assembly 112 generates Boolean sensor data specifying an alert state. In either case, the motion sensor assembly 112 can communicate the sensor data to the base station 114. It should be noted that the specific sensing modalities described above are not limiting to the present disclosure. For instance, as one of many potential examples, the motion sensor assembly 112 can base its operation on acquisition of changes in temperature rather than changes in reflected sound waves.

Continuing with the example of FIG. 1, the keypad 108 is configured to interact with a user and interoperate with the other devices disposed in the location 102A in response to interactions with the user. For instance, in some examples, the keypad 108 is configured to receive input from a user that specifies one or more commands and to communicate the specified commands to one or more addressed devices or processes. These addressed devices or processes can include one or more of the devices disposed in the location 102A and/or one or more of the monitor interfaces 130 or the surveillance service 128. The commands can include, for example, codes that authenticate the user as a resident of the location 102A and/or codes that request activation or deactivation of one or more of the devices disposed in the location 102A. Alternatively or additionally, in some examples, the keypad 108 includes a user interface (e.g., a tactile interface, such as a set of physical buttons or a set of virtual buttons on a touchscreen) configured to interact with a user (e.g., receive input from and/or render output to the user). Further still, in some examples, the keypad 108 can receive responses to the communicated commands and render the responses via the user interface as visual or audio output.

Continuing with the example of FIG. 1, the base station 114 is configured to interoperate with other security system devices disposed at the location 102A to provide local command and control and store-and-forward functionality via execution of the surveillance client 136. In some examples, to implement store-and-forward functionality, the base station 114, through execution of the surveillance client 136, receives sensor data, packages the data for transport, and stores the packaged sensor data in local memory for subsequent communication. This communication of the packaged sensor data can include, for instance, transmission of the packaged sensor data as a payload of a message to one or more of the transport services 126 when a communication link to the transport services 126 via the network 118 is operational. In some examples, packaging the sensor data can include filtering the sensor data using one or more filter zones and/or generating one or more summaries (maximum values, average values, changes in values since the previous communication of the same, etc.) of multiple sensor readings. To implement local command and control functionality, the base station 114 executes a variety of programmatic operations through execution of the surveillance client 136 in response to various events. Examples of these events can include reception of commands from the keypad 108, reception of commands from one of the monitor interfaces 130 or the customer interface application 132 via the network 118, or detection of the occurrence of a scheduled event. The programmatic operations executed by the base station 114 via execution of the surveillance client 136 in response to events can include activation or deactivation of one or more of the devices 104, 106, 108, 110, and 112; sounding of an alarm; reporting an event to the surveillance service 128; and communicating location data to one or more of the transport services 126 to name a few operations. The location data can include data specifying sensor readings (sensor data), configuration data of any of the devices disposed at the location 102A, commands input and received from a user (e.g., via the keypad 108 or a customer interface 132), or data derived from one or more of these data types (e.g., filtered sensor data, summarizations of sensor data, event data specifying an event detected at the location via the sensor data, etc.).

Continuing with the example of FIG. 1, the transport services 126 are configured to receive messages from monitored locations (e.g., the location 102A), parse the messages to extract payloads included therein, and store the payloads and/or data derived from the payloads within one or more data stores hosted in the data center environment 124. In some examples, the transport services 126 expose and implement one or more application programming interfaces (APIs) that are configured to receive, process, and respond to calls from base stations (e.g., the base station 114) via the network 118. Individual instances of a transport service within the transport services 126 can be associated with and specific to certain manufactures and models of location-based monitoring equipment (e.g., SIMPLISAFE equipment, RING equipment, etc.). The APIs can be implemented using a variety of architectural styles and interoperability standards. For instance, in one example, the API is a web services interface implemented using a representational state transfer (REST) architectural style. In this example, API calls are encoded in Hypertext Transfer Protocol (HTTP) along with JavaScript Object Notation and/or extensible markup language. These API calls are addressed to one or more uniform resource locators (URLs) that are API endpoints monitored by the transport services 126. In some examples, portions of the HTTP communications are encrypted to increase security. Alternatively or additionally, in some examples, the API is implemented as a .NET web API that responds to HTTP posts to particular URLs. Alternatively or additionally, in some examples, the API is implemented using simple file transfer protocol commands. Thus, the APIs as described herein are not limited to any particular implementation.

Continuing with the example of FIG. 1, the surveillance service 128 is configured to control overall logical setup and operation of the system 100. As such, the surveillance service 128 can interoperate with the transport services 126, the monitor interfaces 130, the customer interfaces 132, and any of the devices disposed at the location 102A via the network 118. In some examples, the surveillance service 128 is configured to monitor data from a variety of sources for reportable events (e.g., a break-in event) and, when a reportable event is detected, notify one or more of the monitor interfaces 130 and/or the customer interfaces 132 of the reportable event. In some examples, the surveillance service 128 is also configured to maintain state information regarding the location 102A. This state information can indicate, for instance, whether the location 102A is safe or under threat. In certain examples, the surveillance service 128 is configured to change the state information to indicate that the location 102A is safe only upon receipt of a communication indicating a clear event (e.g., rather than making such a change in response to discontinuation of reception of break-in events). This feature can prevent a "crash and smash" robbery from being successfully executed. In addition, in some examples, the surveillance service 128 is configured to setup and use zones. Such setup of the zones can include interacting with monitoring personnel via the monitor interfaces 130, interacting with a customer via a customer interface 132, and/or executing autonomous zone recommendation processes as described herein.

Continuing with the example of FIG. 1, individual monitor interfaces 130 are configured to control computing device interaction with monitoring personnel and to execute a variety of programmatic operations in response to the interactions. For instance, in some examples, the monitor interface 130 controls its host device to provide information regarding reportable events detected at monitored locations, such as the location 102A, to monitoring personnel. Such events can include, for example, movement within an intruder zone or outside a filter zone. Alternatively or additionally, in some examples, the monitor interface 130 controls its host device to interact with a user to configure features of the system 100, such as one or more monitor zones.

Continuing with the example of FIG. 1, individual customer interfaces 132 are configured to control computing device interaction with a customer and to execute a variety of programmatic operations in response to the interactions. For instance, in some examples, the customer interface 132 controls its host device to provide information regarding reportable events detected at monitored locations, such as the location 102A, to the customer. Such events can include, for example, movement within an intruder zone or outside a filter zone. Alternatively or additionally, in some examples, the customer interface 132 is configured to process input received from the customer to activate or deactivate one or more of the devices disposed within the location 102A. Further still, in some examples, the customer interface 132 configures features of the system 100, such as one or more customer zones, in response to input from a user.

Turning now to FIG. 2, a schematic diagram of a smart lock system 200 is illustrated, in accordance with some examples. As shown in FIG. 2, smart lock system 200 may include a remote computing environment 202, a user device 204, and a lock subsystem 206. The smart lock system 200 may be used to initiate calibration of the door lock 220 from a user device 204 through a remote computing environment 202.

When a request (e.g., a lock calibration request) is initiated, the user device 204 may send the request to the remote computing environment 202. The request may include an instruction to initiate a calibration routine for the door lock 220. The request may also include an identifier specifying to which base station 218 the request should be sent, and may include an identifier specifying which door lock 220 to calibrate. In response to receiving the request, the remote computing environment 202 may send an instruction (e.g., a lock calibration instruction) to the base station 214. In response to receiving the instruction, the base station 218 sends a command (e.g., calibration command) to the door lock 220.

The request may be sent from the user device 204 via a first network or communication link (e.g., communication channel) to the remote computing environment 202, where the first communication link may include a cellular connection, a Wi-Fi connection, a wired connection, or another wired or wireless communication link. Similarly, the instruction may be sent from the remote computing environment 202 via a second communication link to the base station 218, where the second communication link may a wired or wireless communication link. In an example, the request may be sent from the user device 204 via a cellular network to the remote computing environment 202, and the instruction may be sent from the remote computing environment 202 to an internet protocol (IP) address associated with the base station 218. The first and second communication links may include network communication links to enable communications using an internet protocol (IP). This use of networked communication may enable the remote computing environment 202 to be remote from (e.g., beyond a direct communication range of) the user device 204 and from the base station 218.

The command may be sent from the base station 218 via a third communication link to the door lock 220, where the third communication link may include a direct radio frequency (RF) communication channel between the base station 218 and the door lock 220. In some examples, the communication between the base station 218 and the door lock 220 may include an RF communication channel that uses a proprietary communication protocol, an encryption protocol, or other communication protocol configuration to provide improved communication security and reliability.

The architecture and communication pathways within the smart lock system 200 provides various benefits. The use of multiple communication links enables recalibration of the door lock 220 without requiring the user device 204 to be within a range of a Bluetooth radio or other direct radio communication range with the door lock 220. In some examples, the lock recalibration may be initiated from a user device 204 that is beyond or outside of a direct communication range with the door lock 220, such as beyond the range of a Bluetooth radio or beyond the range of a near-field communication (NFC) radio. This may also enable a lock recalibration from a user device 204 that does not have the ability to communicate directly with the door lock 220, such as from a desktop computer or other user device that does not support Bluetooth or NFC communication.

The remote location of the remote computing environment 202 may enable improved reliability of communication and device tracking, such as by monitoring and communicating door lock status updates or calibration commands. In an example, if one or more of the user device 204, the base station 218, or the door lock 220 are offline or are otherwise not able to send or receive communication, then remote computing environment 202 may receive and store door lock status updates or calibration commands from any online devices, and may send the door lock status updates or calibration commands when target devices become available again. For example, the remote computing environment 202 may determine that the door lock 220 is offline based on a failure to receive expected periodic status updates from the door lock 220, and a resumption of these periodic status updates may indicate that door lock 220 is available again. In another example, the remote computing environment 202 may determine that the door lock 220 is offline or available by sending connection test messages (e.g., a network ping) to the door lock 220. In another example, the user device 204 may attempt to connect to door lock 220 through the remote computing environment 202, and the user device 204 or the remote computing environment 202 may determine that the door lock 220 is offline or available based on those connection attempts.

Continuing with the example of FIG. 2, once the lock calibration is finished, the lock subsystem 206 may send a message (e.g., a lock calibration completion message) from the lock subsystem 206 through the remote computing environment 202 to the user device 204. In response to receiving the message at the user device 204, the user device 204 may display an indication of the status of the lock calibration. The user device 204 may prompt the user to confirm that the calibration was completed successfully. In some examples, the calibration completion prompt may ask the user to confirm that a latch (e.g., deadbolt latch) of the door lock 220 is in an expected final position (e.g., locked position). In response to an input from the user confirming the calibration was completed successfully, a message (e.g., a user confirmation message) may be relayed back to the remote computing environment 202, where the calibration is recorded.

The smart lock system 200 shown in FIG. 2 further shows example additional subcomponents within the remote computing environment 202, a user device 204, and a lock subsystem 206. In the subcomponent example shown in FIG. 2, when a request (e.g., a lock calibration request) is initiated, an application (e.g., a lock management application) 208 running on the user device 204 may send the request to calibrate the lock to an application hub 210 at the remote computing environment 202 that interfaces with the application 208. The request may be relayed by the application hub 210 to one or more of a backend service dedicated to the door lock 220 or a backend service dedicated to the base station 214. The backend service dedicated to the base station 214, for example, may then send an instruction (e.g., a lock calibration instruction) to a base station backend interface service 216 at the lock subsystem 206 that interfaces with the remote computing environment 202, and which may relay the instruction to a base station 218. In response to receiving the instruction, the base station 218 sends a command (e.g., a calibration command) to the door lock 220. In some examples, the communication between the base station 218 and the door lock 220 may include a proprietary radio frequency (RF) communication channel.

Continuing with the additional subcomponents example of FIG. 2, once calibration of the lock is finished, the lock subsystem 206 may relay a message (e.g., a lock calibration completion message) from the lock subsystem 206 through the remote computing environment 202 to the user device 204. In some examples, the message is sent from the base station backend interface service 216 to a base station event stream 222, to the backend service dedicated to the lock 212, to the application hub 210, and to the user device 204, where an indication of the message is displayed in the lock management application 208. As noted above, application 208 may prompt the user to confirm that the calibration was completed successfully. In some examples, the calibration completion prompt may ask the user to confirm that a latch (e.g., deadbolt latch) of the door lock 220 is in an expected final position (e.g., locked position). In response to the user confirming the calibration was completed successfully, a message (e.g., a user confirmation message) may be relayed back through the application hub 210 to the backend service dedicated to the lock 212, where the calibration is recorded. While FIG. 2 shows an example set of subcomponents within the remote computing environment 202, a user device 204, and a lock subsystem 206, there may be more or fewer subcomponents in other examples. Any functionality of any of the subcomponents may be shared or be provided in a single subcomponent, or the subcomponents may be otherwise modified or rearranged, and the scope of the present disclosure is not limited by the example subcomponents shown in FIG. 2. It is understood, for example, that reference herein to functionality of a subcomponent of the remote computing environment 202 is also a more general reference to the functionality of the overall remote computing environment 202.

The remote computing environment 202, such as through the backend service dedicated to the lock 212, may track, measure, or otherwise record the time elapsed since the most recent successful calibration, and after a period of time (e.g., six months, one year) has elapsed, the remote computing environment 202, such as through the backend service dedicated to the lock 212 and the application hub 210, may send a message to the user device 204 to remind the user to recalibrate the door lock 220. In some examples, when a user launches the lock management application 208, the lock management application 208 may retrieve data (e.g., lock calibration tracking data) from the remote computing environment 202, such as from the backend service dedicated to the lock 212. The data may include information on the current calibration status for the door lock 220 and/or the last time the door lock 220 was calibrated. The lock management application 208 may use the data to display a status or indicator (e.g., a calibration status) of the door lock 220 to the user and/or to prompt re-calibration of the door lock 220. The lock management application 208 provides improved overall performance of the door lock 220 by ensuring periodic lock calibration. The lock management application 208 may also enable the user to recalibrate the door lock 220 on demand, such as when a door strike plate is adjusted or replaced.

Continuing with the example of FIG. 2, when recalibration of the door lock 220 is requested, such as on-demand or through a prompt transmitted to the user via the lock management application 208, the lock management application 208 may submit the request to the application hub 210. The request to recalibrate the lock may include an identifier (e.g., serial number) for the base station 218 and/or the door lock 220. In an example, the request may include an identifier for the base station 218 but not for the door lock 220, and the remote computing environment 202 or the base station backend interface service 216 may use the base station identifier to identify the door lock 220 to be calibrated. In an example, the request may include an identifier for the door lock 220 but not for the base station 218, and the remote computing environment 202 or the base station backend interface service 216 may use the lock identifier to identify to which base station 218 the calibration instruction should be sent. In another example, some other identifier may be included in the request, such as an identifier of the user or user device, and the request may instruct the remote computing environment 202 or the lock subsystem 206 to recalibrate a lock or any locks associated with the other identifier (e.g., user or user device 204) or to recalibrate a lock or all locks associated with a base station 218 associated with the other identifier. In an example, the remote computing environment 202 may use the base station identifier to identify a communication channel between the remote computing environment 202 and the lock subsystem 206, such as by identifying an IP address associated with the base station 218. Similarly, the base station 218 may use the lock identifier to identify a communication channel between the base station 218 and the door lock 220, such as by identifying an RF communication channel associated with the door lock 220.

The architecture and communication pathways within the smart lock system 200 provide the ability of to initiate recalibration of the door lock 220 from the user device without requiring the user device 204 to be in direct communication (e.g., having established a communication link free of intermediary devices between endpoints) with the door lock 220. In some examples, the lock recalibration may be initiated from a user device 204 that is beyond or outside of a direct communication range with the door lock 220, such as beyond the range of a Bluetooth radio or beyond the range of a near-field communication (NFC) radio. This may also enable a lock recalibration from a user device 204 that that is not a mobile device, such as from a desktop computer or other user device that does not support Bluetooth or NFC communication.

The architecture in smart lock system 200 provides various technical benefits. In some examples, the use of cloud-to-device communication between the lock management application 208, remote computing environment 202, and base station 218 provides improved reliability of the lock by virtue of distributed nature of the system that allows remote lock calibration without the need for the mobile device to be near the door lock in to directly connect to the lock. The smart lock system 200 removes proximity constraints and improves the likelihood that the lock will be calibrated according to a lock calibration schedule (e.g., every six months) because calibration is no longer dependent on a user device being in the same vicinity as the door lock to initiate lock calibration. The smart lock system 200 also removes physical barriers to lock calibration present in existing systems and also improves the user experience, such as by providing full lifecycle management of the door lock 220 through a lock management application 208 on a user device 204. While smart lock system 200 is described with respect to a door lock 220, the architecture may be applied for control and recalibration of doorknob locks, door handle locks, door deadbolt locks, padlocks, safe locks, cable locks (e.g., bike lock, laptop lock), and other types of electronically activated locks.

Turning now to FIG. 3, an example sequence diagram of a smart lock process 300 is schematically illustrated, in accordance with some examples. The smart lock process 300 can be executed, in some examples, by a smart lock (e.g., the smart lock system 200 of FIG. 2). More specifically, in some examples, at least a portion of the smart lock process 300 is executed by a system that includes a user device 204 (e.g., user device 204 of FIG. 2), a remote computing environment 202 (e.g., remote computing environment 202 of FIG. 2), a base station 218 (e.g., base station 218 of FIG. 2), and a door lock 220 (e.g., door lock 220 of FIG. 2).

As shown in FIG. 3, the smart lock process 300 starts with the user device 204 sending a calibration request 302 to the remote computing environment 202. This request may include information identifying the door lock 220 requiring calibration or identifying the base station 218. Upon receiving the request, the remote computing environment 202 sends a calibration instruction 304 to the base station 218 associated with the lock. This calibration instruction 304 may include unique identifiers for both the door lock 220 and base station 218, allowing the base station 218 to identify the base station 218 or the door lock 220 to be calibrated. The base station 218 then transmits a calibration command 306 to the targeted door lock 220. The communication between the base station 218 and the door lock 220 may use a wireless RF communication channel, and may use a proprietary wireless protocol.

After performing the calibration routine, the door lock 220 sends a completion confirmation message 308 back to the base station 218 confirming the calibration has finished. The base station 218 may forward this completion confirmation message 308 to the remote computing environment 202 to indicate that the requested calibration has been completed. The remote computing environment 202 then sends a completion notification 310 back to the user device to indicate that calibration has been completed. This completion notification 310 may also cause the user device 204 to generate a prompt for confirming whether the calibration finished correctly or should be repeated. In response to the prompt, the user device 204 may return a user confirmation of calibration 312 to the remote computing environment 202, which may record the completed status. If the user confirmation of calibration 312 indicates the calibration was incomplete, the remote computing environment 202 may send another calibration instruction 304 to the base station 218, which may send another calibration command 306 to the door lock 220 to retry the calibration sequence. This robust, multi-stage communication protocol ensures reliable remote calibration through machine-to-machine messaging at each point in the sequence.

Turning now to FIG. 4, an example base station 400 is schematically illustrated, in accordance with some examples. The base station 400 may illustrate an example of base station 218 of FIG. 2. As shown in FIG. 4, the base station 400 may include at least one processor 401, volatile memory 402, non-volatile memory 406, at least one network interface 404, a user interface 412, a battery assembly 416, a radio interface 418, and an interconnection mechanism

414. The non-volatile memory 406 stores executable code 408 and includes a data store 410. In some examples illustrated by FIG. 4, the features of the base station 400 enumerated above are incorporated within, or are a part of, a housing 420.

In some examples, the non-volatile (non-transitory) memory 406 includes one or more read-only memory (ROM) chips; one or more hard disk drives or other magnetic or optical storage media; one or more solid state drives (SSDs), such as a flash drive or other solid-state storage media; and/or one or more hybrid magnetic and SSDs. In certain examples, the code 408 stored in the non-volatile memory can include an operating system and one or more applications or programs that are configured to execute under the operating system. Alternatively or additionally, the code 408 can include specialized firmware and embedded software that is executable without dependence upon a commercially available operating system. Regardless, execution of the code 408 can, among other things, implement the base station backend interface service 216 of FIG. 2 and can result in manipulated data that is a part of the data store 410.

Continuing the example of FIG. 4, the processor 401 can include one or more programmable processors to execute one or more executable instructions, such as a computer program specified by the code 408, to control the operations of the base station 400. As used herein, the term "processor" describes circuitry that executes a function, an operation, or a sequence of operations. The function, operation, or sequence of operations can be hard coded into the circuitry or soft coded by way of instructions held in a memory device (e.g., the volatile memory 402) and executed by the circuitry. In some examples, the processor 401 is a digital processor, but the processor 401 can be analog, digital, or mixed. As such, the processor 401 can execute the function, operation, or sequence of operations using digital values and/or using analog signals. In some examples, the processor 401 can be embodied in one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLAs), or multicore processors. Examples of the processor 401 that are multicore can provide functionality for parallel, simultaneous execution of instructions or for parallel, simultaneous execution of one instruction on more than one piece of data.

Continuing with the example of FIG. 4, prior to execution of the code 408 the processor 401 can copy the code 408 from the non-volatile memory 406 to the volatile memory 402. In some examples, the volatile memory 402 includes one or more static or dynamic random-access memory (RAM) chips and/or cache memory (e.g., memory disposed on a silicon die of the processor 401). Volatile memory 402 can offer a faster response time than a main memory, such as the non-volatile memory 406.

Through execution of the code 408, the processor 401 can control operation of the network interface 404. For instance, in some examples, the network interface 404 includes one or more physical interfaces (e.g., a radio, an ethernet port, a universal serial bus (USB) port, etc.) and a software stack including drivers and/or other code 408 that is configured to communicate with the one or more physical interfaces to support one or more LAN, PAN, and/or WAN standard communication protocols. The communication protocols can include, for example, transmission control protocol (TCP) and user datagram protocol (UDP) among others. As such, the network interface 404 enables the base station 400 to access and communicate with other computing devices (e.g., the remote computing environment 202 or the user device 204 of FIG. 2) via a computer network. For instance, in at least one example, the network interface 404 utilizes sub-GHz wireless networking to transmit wake messages to the other computing devices to request streams of sensor data.

Through execution of the code 408, the processor 401 can control operation of the radio interface 418. For instance, in some examples, the radio interface 418 includes one or more physical radio interfaces and a software stack including drivers and/or other code 408 that is configured to communicate with the one or more physical interfaces to support one or more RF communication protocols. The RF communication protocols can include, for example, Bluetooth communication, ZigBee (e.g., IEEE 802.15.4-based protocol), Z-Wave, Near-Field Communication (NFC), or a proprietary RF unencrypted or encrypted protocol. As such, the radio interface 418 enables the base station 400 to access and communicate with other computing devices that may not use a network interface (e.g., other devices disposed in or near the lock subsystem 206 of FIG. 2 via a wireless RF communication channel.

Through execution of the code 408, the processor 401 can control operation of hardware and a software stack including drivers and/or other code 408 that is configured to communicate with other system devices. As such, the base station 400 interacts with other system components in response to received inputs. The input can specify values to be stored in the data store 410. The output can indicate values stored in the data store 410. It should be noted that, in some examples, the base station 400 may include one or more light-emitting diodes (LEDs) to visually communication information, such as system status or alarm events. Alternatively or additionally, in some examples, the base station 400 includes a 95 dB siren that the processor 401 sounds to indicate that a break-in event has been detected.

Continuing with the example of FIG. 4, the various features of the base station 400 described above can communicate with one another via the interconnection mechanism 414. In some examples, the interconnection mechanism 414 includes a communications bus. In addition, in some examples, the battery assembly 416 is configured to supply operational power to the various features of the base station 400 described above. In some examples, the battery assembly 416 includes at least one rechargeable battery (e.g., one or more NiMH or lithium batteries). In some examples, the rechargeable battery has a runtime capacity sufficient to operate the base station 400 for 24 hours or longer while the base station 400 is disconnected from or otherwise not receiving line power. Alternatively or additionally, in some examples, the battery assembly 416 includes power supply circuitry to receive, condition, and distribute line power to both operate the base station 400 and recharge the rechargeable battery. The power supply circuitry can include, for example, a transformer and a rectifier, among other circuitry, to convert AC line power to DC device and recharging power.

Turning now to FIG. 5, an example smart lock flowchart 500 is schematically illustrated, in accordance with some examples. Smart lock flowchart 500 may be implemented as a method or as a non-transitory computer-readable medium storing instructions that, when executed by at least one processor of at least one user device, cause the at least one user device to perform the operations identified in smart lock flowchart 500. At 502, a status (e.g., a current status) of calibration may be communicated to an app on a user device, and may indicate that the door lock needs calibration. The status of calibration may be generated by a remote computing environment, by a base station, or by a door lock. The status of calibration may be generated in response to the remote computing environment or the door lock tracking the elapsed time since the last successful calibration (e.g., six months), and automatically initiating a calibration request once a set time period has passed. The lock management mobile app may retrieve data identifying the most recent calibration date and prompt the user to recalibrate if too much time has elapsed. The remote computing environment, the base station, the door lock, or the lock management mobile app may also calibration by monitoring diagnostic metrics from the lock that may indicate drift or reduced performance. In an example, the status of calibration is generated at a door lock, sent through a base station to a remote computing environment, and forwarded to an application on a user device. In another example, the status of calibration is generated at a remote computing environment that tracks a calibration expiry period associated with the lock, and forwards the current status of calibration to an application on a user device.

At 504, a prompt (e.g., a calibration prompt) may be displayed on a user interface of the user device based on the status of calibration. The prompt may be generated in response to receiving a status of calibration at the user device, or may be generated by an application running on the user device. The prompt may identify the calibration status of one or more door locks, and may prompt a user to authorize a calibration routine for one or more door locks.

At 506, an instruction to initiate calibration of the door lock may be generated in response to a user input received via the user interface after display of the calibration prompt. The instruction may include one or more identifiers, such as identifiers for the specific door lock needing calibration or for the base station associated with that door lock. The identifier may enable the instruction to be routed to the proper door lock. The instruction may also contain additional calibration information, such as information describing the type of calibration sequence to perform or parameters to optimize during the calibration routine. By including identification or calibration details, the initiation instruction provides the necessary information to start and route the calibration routine to the correct lock for optimized performance. The instruction to initiate calibration may be forwarded from the user device though the remote computing environment to the base station, and the base station may instruct a calibration of the door lock. In response to receiving the instruction to initiate calibration at the door lock, the door lock may initiate a calibration sequence.

Following completion of the calibration sequence at the door lock, at 508, the door lock may send a calibration confirmation to the base station. The base station may forward the calibration confirmation to the remote computing environment, which may record the confirmation and restart the calibration delay associated with the lock. The remote computing environment may send the calibration confirmation message to the user device, and a calibration confirmation prompt may be displayed on the user interface of the user device. In response to the prompt, if the user confirms the lock calibration has been completed, a message may be sent from the user device to the remote computing environment to record the user confirmation. In response to the prompt, if the user indicates the lock calibration did not occur or was not completed, the lock calibration may be reinitiated or another action may be prompted or initiated, such as troubleshooting for the lock.

In certain examples, the calibration instruction comprises at least one of an identifier for the door lock or an identifier for the base station. The remote computing environment may forward one or both of these identifiers and the calibration instruction to the base station. In response, the base station may identify the door lock based on the identifier for the door lock and instruct the door lock to initiate the calibration of the door lock. In certain examples, retrieving current status of calibration from the remote computing environment comprises receiving the current status of calibration from the remote computing environment based on a timing for calibration of the door lock based on a schedule.

Turning now to FIG. 6, an example calibration initiation flowchart 600 is schematically illustrated, in accordance with some examples. The calibration initiation flowchart 600 may correspond to one or more steps that form a subroutine of initiation of calibration of a door lock (e.g., the door lock calibration 506 of FIG. 5). Calibration initiation flowchart 600 may be implemented as a method or as a non-transitory computer-readable medium storing instructions that, when executed by at least one processor of at least one user device, cause the at least one user device to perform the operations identified in the calibration initiation flowchart 600.

At 602, the calibration initiation flowchart 600 begins with the user device sending a calibration request to the remote computing environment. At 604, the remote computing environment sends a lock calibration instruction to the base station. At 606, the base station sends a calibration command to the door lock. At 608, the door lock initiates a calibration sequence. At 610, after completing calibration, the door lock sends a calibration confirmation to the base station. At 612, the calibration confirmation is forwarded from the base station to the remote computing environment. At 614, the calibration confirmation is forwarded from the remote computing environment to the user device. At 616, the user device may prompt the user to confirm the calibration was completed properly (e.g., the calibration confirmation 508 of FIG. 5).

The calibration initiation flowchart 600 demonstrates the calibration request pathway through the system architecture down to the door lock, and the subsequent confirmations and notifications that are passed back from the door lock through the remote computing environment to the user device. This leverages the distributed system components to improve reliability of the remote calibration of the door lock.

Turning now to FIG. 7, an example base station flowchart 700 is schematically illustrated, in accordance with some examples. Base station flowchart 700 may be implemented as a method or as a non-transitory computer-readable medium storing instructions that, when executed by at least one processor of at least one base station, cause the at least one base station to perform the operations identified in base station flowchart 700.

At 702, the base station receives a request from a remote computing environment to initiate calibration of a door lock. The request may include an identifier of the door lock. The base station may include a network communication interface. The base station may use the network communication interface to communicate with the remote computing environment or the door lock. In an example, the base station may receive the calibration request from the remote computing environment via the network communication interface.

At 704, the base station transmits a signal to the door lock based on the identifier. The signal may initiate calibration of the door lock. The base station may include a wireless RF communication radio. The base station may use the wireless RF communication radio to communicate with the remote computing environment or the door lock. In an example, the base station transmits the signal via a wireless RF communication radio within the base station to a corresponding wireless RF radio in the door lock.

At 706, the base station receives a return signal from the door lock indicative of a status of calibration of the door lock. At 708, the base station provides a message indicative of the status of calibration via the remote computing environment to a user device remote from the door lock confirm calibration of the door lock.

The base station may also receive an indication of incomplete calibration from the user device via the remote computing environment. This may occur subsequent to an initial calibration of the door lock. In an example, following an initial calibration of the door lock, a calibration complete message may be sent to through the remote computing environment to generate a calibration prompt on the user device, and a user may indicate on the calibration prompt that the door lock should be calibrated again. In response to receiving the indication of incomplete calibration from the user device, the base station may transmit a recalibration signal to the door lock, the signal to reinitiate the calibration of the door lock.

Turning now to FIG. 8, an example remote computing environment flowchart 800 is schematically illustrated, in accordance with some examples. Remote computing environment flowchart 800 may be implemented as a method or as a non-transitory computer-readable medium storing instructions that, when executed by at least one processor of at least one remote computing environment, cause the at least one remote computing environment to perform the operations identified in remote computing environment flowchart 800.

At 802, the remote computing environment initiates the calibration process by continuously tracking the time elapsed since the most recent successful calibration of each door lock. At 804, the remote computing environment compares the elapsed time to a defined calibration interval (e.g., six months, one year) for the door lock. At 806, when the elapsed time exceeds the defined interval, the remote computing environment prompts the user via the mobile application to recalibrate the door lock.

At 808, when the user initiates the calibration through the app, the calibration request is sent from the user device and received by the remote computing environment. At 810, the remote computing environment analyzes the calibration request to determine one or more of a base station or door lock to be calibrated. In some examples, the calibration request includes an identifier of the base station or the door lock, and the remote computing environment uses the identifier to determine to which base station or door lock the calibration instruction should be sent. At 812, the remote computing environment sends a calibration instruction to the base station, and the base station forwards this calibration instruction to the door lock to be calibrated.

At 814, after calibration is complete, the base station sends a confirmation message back to the remote computing environment. At 816, the remote computing environment then notifies the user application that the calibration process is complete. At 818, the mobile app prompts the user to confirm completion of the calibration. At 820, if the user device sends an indication to the remote computing environment that the user confirmed that the calibration was completed, the remote computing environment records that the calibration was completed. At 822, if the user device sends an indication to the remote computing environment that the user did not confirm that the calibration was completed, the remote computing environment may send another calibration instruction through the base station to the door lock.

Turning now to FIG. 9, aspects of the data center environment 124 of FIG. 1, the monitoring center environment 120 of FIG. 1, one of the customer devices 122 of FIG. 1, the network 118 of FIG. 1, and a plurality of monitored locations 102A (e.g., location 102A of FIG. 1) through 102N (collectively referred to as the locations) are schematically illustrated, in accordance with some examples. The data center environment 124 may be used to provide the functionality of the remote computing environment 202 of FIG. 2.

As shown in FIG. 9, the data center environment 124 hosts the surveillance service 128 and the transport services 126 (individually referred to as the transport services 126A through 126D). The surveillance service 128 includes a location data store 902, a sensor data store 904, a zone data store 906 (e.g., customer zone 906A, monitor zone 906B), an artificial intelligence (AI) service 908, an event listening service 910, and an identity provider 912. The monitoring center environment 120 includes computing devices 918A through 918M (collectively referred to as computing devices 918) that host monitor interfaces 130A through 130M. Individual locations 102A through 102N include base stations (e.g., the base station 114 of FIG. 1) that host the surveillance clients 136A through 136N (collectively referred to as the surveillance clients 136) and image capture devices (e.g., the image capture device 110 of FIG. 1) that host the software camera agents 138A through 138N (collectively referred to as the camera agents 138).

As shown in FIG. 9, the transport services 126 are configured to process ingress messages 916A through 916D (collectively referred to as ingress messages 916) from the customer interface 132A, the surveillance clients 136, the camera agents 138, and/or the monitor interfaces 130. The transport services 126 are also configured to process egress messages addressed to the customer interface 132A, the surveillance clients 136, the camera agents 138, and the monitor interfaces 130. The location data store 902 is configured to store, within a plurality of records, location data in association with identifiers of customers for whom the location is monitored. For example, the location data may be stored in a record with an identifier of a customer and/or an identifier of the location to associate the location data with the customer and the location. The sensor data store 904 is configured to store, within a plurality of records, sensor data (e.g., one or more frames of image data) separately from other location data but in association with identifiers of locations and timestamps at which the sensor data was acquired. In some examples, the sensor data store 904 is optional and may be use, for example, where the sensor data house therein has specialized storage or processing requirements.

Continuing with the example of FIG. 9, the AI service 908 is configured to process sensor data (e.g., images and/or sequences of images) to identify movement, human faces, and other features within the sensor data. The event listening service 910 is configured to scan location data transported via the ingress messages 916 for event data and, where event data is identified, execute one or more event handlers to process the event data. In some examples, the event handlers can include an event reporter that is configured to identify reportable events and to communicate messages specifying the reportable events to one or more recipient processes (e.g., a customer interface 132 and/or a monitor interface 130). In some examples, the event listening service 910 can interoperate with the AI service 908 to identify events from sensor data. The identity provider 912 is configured to receive, via the transport services 126, authentication requests from the surveillance clients 136 or the camera agents 138 that include security credentials. When the identity provider 912 can authenticate the security credentials in a request (e.g., via a validation function, cross-reference look-up, or some other authentication process), the identity provider 912 can communicate a security token in response to the request. A surveillance client 136 or a camera agent 138 can receive, store, and include the security token in subsequent ingress messages 916, so that the transport service 126A is able to securely process (e.g., unpack/parse) the packages included in the ingress messages 916 to extract the location data prior to passing the location data to the surveillance service 128.

Continuing with the example of FIG. 9, the transport services 126 are configured to receive the ingress messages 916, verify the authenticity of the ingress messages 916, parse the ingress messages 916, and extract the location data encoded therein prior to passing the location data to the surveillance service 128 for processing. This location data can include any of the location data described above with reference to FIG. 1. Individual transport services 126 may be configured to process ingress messages 916 generated by location-based monitoring equipment of a particular manufacturer and/or model. The surveillance clients 136 and the camera agents 138 are configured to generate and communicate to the surveillance service 128 via the network 118, ingress messages 916 that include packages of location data based on sensor information received at the locations 102A through 102N.

Continuing with the example of FIG. 9, the computing devices 918A through 918M are configured to host the monitor interfaces 130. In some examples, individual monitor interfaces 130A-130M are configured to render GUIs including one or more image frames and/or other sensor data. In certain examples, the customer device 122 is configured to host the customer interface 132. In some examples, customer interface 132 is configured to render GUIs including one or more image frames and/or other sensor data. The GUIs may include a display of information related to customer zone 926 and may include one or more prompts to approve various prompts 928 or modify various parameters 922 of the customer device 122. Additional features of the monitor interfaces 130 and the customer interface 132 are described further below with reference to FIG. 10.

Turning now to FIG. 10, a cloud monitoring process 1000 is illustrated as a sequence diagram, in accordance with some examples. The process 1000 can be executed, in some examples, by a security system (e.g., the security system 100 of FIG. 1). More specifically, in some examples, at least a portion of the process 1000 is executed by the location-based devices under the control of device control system (DCS) code (e.g., either the code 308 or 408) implemented by at least one processor (e.g., processor 401 of FIG. 4). The DCS code can include, for example, a camera agent (e.g., the camera agent 138 of FIG. 1). At least a portion of the process 1000 is executed by a base station (e.g., the base station 114 of FIG. 1) under control of a surveillance client (e.g., the surveillance client 136 of FIG. 1). At least a portion of the process 1000 is executed by a monitoring center environment (e.g., the monitoring center environment 120 of FIG. 1) under control of a monitor interface (e.g., the monitor interface 130 of FIG. 1). At least a portion of the process 1000 is executed by a data center environment (e.g., the data center environment 124 of FIG. 1) under control of a surveillance service (e.g., the surveillance service 128 of FIG. 1) or under control of transport services (e.g., the transport services 126 of FIG. 1). At least a portion of the process 1000 is executed by a customer device (e.g., the customer device 122 of FIG. 1) under control of a customer interface (e.g., customer interface 132 of FIG. 1).

As shown in FIG. 10, the process 1000 starts with the surveillance client 136 authenticating with an identity provider (e.g., the identity provider 912 of FIG. 9) by exchanging one or more authentication requests and responses 1004 with the transport service 126. More specifically, in some examples, the surveillance client 136 communicates an authentication request to the transport service 126 via one or more API calls to the transport service 126. In these examples, the transport service 126 parses the authentication request to extract security credentials therefrom and passes the security credentials to the identity provider for authentication. In some examples, if the identity provider authenticates the security credentials, the identity provider generates a security token and transmits the security token to the transport service 126. The transport service 126, in turn, receives a security token and communicates the security token as a payload within an authentication response to the authentication request. In these examples, if the identity provider is unable to authenticate the security credentials, the transport service 126 generates an error code and communicates the error code as the payload within the authentication response to the authentication request. Upon receipt of the authentication response, the surveillance client 136 parses the authentication response to extract the payload. If the payload includes the error code, the surveillance client 136 can retry authentication and/or interoperate with a user interface of its host device to render output indicating the authentication failure. If the payload includes the security token, the surveillance client 136 stores the security token for subsequent use in communication of location data via ingress messages. It should be noted that the security token can have a limited lifespan (e.g., 1 hour, 1 day, 1 week, 1 month, etc.) after which the surveillance client 136 may be required to reauthenticate with the transport services 126.

Continuing with the process 1000, one or more DCSs 1002 hosted by one or more location-based devices acquire 1006 sensor data descriptive of a location (e.g., the location 102A of FIG. 1). The sensor data acquired can be any of a variety of types, as discussed above with reference to FIG. 1. In some examples, one or more of the DCSs 1002 acquire sensor data continuously. In some examples, one or more of the DCSs 1002 acquire sensor data in response to an event, such as expiration of a local timer (a push event) or receipt of an acquisition polling signal communicated by the surveillance client 136 (a poll event). In certain examples, one or more of the DCSs 1002 stream sensor data to the surveillance client 136 with minimal processing beyond acquisition and digitization. In these examples, the sensor data may constitute a sequence of vectors with individual vector members including a sensor reading and a timestamp. Alternatively or additionally, in some examples, one or more of the DCSs 1002 execute additional processing of sensor data, such as generation of one or more summaries of multiple sensor readings. Further still, in some examples, one or more of the DCSs 1002 execute sophisticated processing of sensor data. For instance, if the security sensor includes an image capture device, the security sensor may execute image processing routines such as edge detection, motion detection, facial recognition, threat assessment, and reportable event generation.

Continuing with the process 1000, the DCSs 1002 communicate the sensor data 1008 to the surveillance client 136. As with sensor data acquisition, the DCSs 1002 can communicate the sensor data 1008 continuously or in response to an event, such as a push event (originating with the DCSs 1002) or a poll event (originating with the surveillance client 136).

Continuing with the process 1000, the surveillance client 136 monitors 1010 the location by processing the received sensor data 1008. For instance, in some examples, the surveillance client 136 executes one or more image processing routines. These image processing routines may include any of the image processing routines described above with reference to the operation 1006. By distributing at least some of the image processing routines between the DCSs 1002 and surveillance clients 136, some examples decrease power consumed by battery-powered devices by off-loading processing to line-powered devices. Moreover, in some examples, the surveillance client 136 may execute an ensemble threat detection process that utilizes sensor data 1008 from multiple, distinct DCSs 1002 as input. For instance, in at least one example, the surveillance client 136 will attempt to corroborate an open state received from a contact sensor with motion and facial recognition processing of an image of a scene including a window to which the contact sensor is affixed. If two or more of the three processes indicate the presence of an intruder, the threat score is increased and or a break-in event is declared, locally recorded, and communicated. Other processing that the surveillance client 136 may execute includes outputting local alarms (e.g., in response to detection of particular events and/or satisfaction of other criteria) and detection of maintenance conditions for location-based devices, such as a need to change or recharge low batteries and/or replace/maintain the devices that host the DCSs 1002. Any of the processes described above within the operation 1010 may result in the creation of location data that specifies the results of the processes.

Continuing with the process 1000, the surveillance client 136 communicates the location data 1014 to the surveillance service 128 via one or more ingress messages 1012 to the transport services 126. As with sensor data 1008 communication, the surveillance client 136 can communicate the location data 1014 continuously or in response to an event, such as a push event (originating with the surveillance client 136) or a poll event (originating with the surveillance service 128).

Continuing with the process 1000, the surveillance service 128 processes 1016 received location data. For instance, in some examples, the surveillance service 128 executes one or more routines described above with reference to the operations 1006 and/or 1010. Additionally or alternatively, in some examples, the surveillance service 128 calculates a threat score or further refines an existing threat score using historical information associated with the location identified in the location data and/or other locations geographically proximal to the location (e.g., within the same zone improvement plan (ZIP) code). For instance, in some examples, if multiple break-ins have been recorded for the location and/or other locations within the same ZIP code within a configurable time span including the current time, the surveillance service 128 may increase a threat score calculated by a DCS 1002 and/or the surveillance client 136. In some examples, the surveillance service 128 determines, by applying a set of rules and criteria to the location data 1014, whether the location data 1014 includes any reportable events and, if so, communicates an event report 1016A to the monitor interface 130 and/or 1016B to the customer interface 132. A reportable event may be an event of a certain type (e.g., break-in) or an event of a certain type that satisfies additional criteria (e.g., movement within a particular zone combined with a threat score that exceeds a threshold value). The event reports 1016A and/or 1016B may have a priority based on the same criteria used to determine whether the event reported therein is reportable or may have a priority based on a different set of criteria or rules.

Continuing with the process 1000, the monitor interface 130 interacts 1020 with monitoring personnel through, for example, one or more GUIs. These GUIs may provide details and context regarding one or more reportable events.

Continuing with the process 1000, the customer interface 132 interacts 1022 with at least one customer through, for example, one or more GUIs. These GUIs may provide details and context regarding one or more reportable events.

It should be noted that the processing of sensor data and/or location data, as described above with reference to the operations 1006, 1010, and 1016, may be executed by processors disposed within various parts of the system 100. For instance, in some examples, the DCSs 1002 execute minimal processing of the sensor data (e.g., acquisition and streaming only) and the remainder of the processing described above is executed by the surveillance client 136 and/or the surveillance service 128. This approach may be helpful to prolong battery runtime of location-based devices. In other examples, the DCSs 1002 execute as much of the sensor data processing as possible, leaving the surveillance client 136 and the surveillance service 128 to execute only processes that require sensor data that spans location-based devices and/or locations. This approach may be helpful to increase scalability of the system 100 with regard to adding new locations.

Turning now to FIG. 11, a computing device 1100 is illustrated schematically, in accordance with some examples. The computing device 1100 may represent various components within the smart lock system 200, such as the user device 204, one or more components within the remote computing environment 202, or the door lock 220. As shown in FIG. 11, the computing device includes at least one processor 1101, volatile memory 1102, one or more interfaces 1104, non-volatile memory 1106, and an interconnection mechanism 1112. The non-volatile memory 1106 includes code 1108 and at least one data store 1110.

In some examples, the non-volatile (non-transitory) memory 1106 includes one or more read-only memory (ROM) chips; one or more hard disk drives or other magnetic or optical storage media; one or more solid state drives (SSDs), such as a flash drive or other solid-state storage media; and/or one or more hybrid magnetic and SSDs. In certain examples, the code 1108 stored in the non-volatile memory can include an operating system and one or more applications or programs that are configured to execute under the operating system. Alternatively or additionally, the code 1108 can include specialized firmware and embedded software that is executable without dependence upon a commercially available operating system. Regardless, execution of the code 1108 can result in manipulated data that may be stored in the data store 1110 as one or more data structures. The data structures may have fields that are associated through location in the data structure. Such associations may likewise be achieved by allocating storage for the fields in locations within memory that convey an association between the fields. However, other mechanisms may be used to establish associations between information in fields of a data structure, including through the use of pointers, tags, or other mechanisms.

Continuing the example of FIG. 11, the processor 1101 can be one or more programmable processors to execute one or more executable instructions, such as a computer program specified by the code 1108, to control the operations of the computing device 1100. As used herein, the term "processor" describes circuitry that executes a function, an operation, or a sequence of operations. The function, operation, or sequence of operations can be hard coded into the circuitry or soft coded by way of instructions held in a memory device (e.g., the volatile memory 1102) and executed by the circuitry. In some examples, the processor 1101 is a digital processor, but the processor 1101 can be analog, digital, or mixed. As such, the processor 1101 can execute the function, operation, or sequence of operations using digital values and/or using analog signals. In some examples, the processor 1101 can be embodied in one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLAs), or multicore processors. Examples of the processor 1101 that are multicore can provide functionality for parallel, simultaneous execution of instructions or for parallel, simultaneous execution of one instruction on more than one piece of data.

Continuing with the example of FIG. 11, prior to execution of the code 1108 the processor 1101 can copy the code 1108 from the non-volatile memory 1106 to the volatile memory 1102. In some examples, the volatile memory 1102 includes one or more static or dynamic random-access memory (RAM) chips and/or cache memory (e.g., memory disposed on a silicon die of the processor 1101). Volatile memory 1102 can offer a faster response time than a main memory, such as the non-volatile memory 1106.

Through execution of the code 1108, the processor 1101 can control operation of the interfaces 1104. The interfaces 1104 can include network communication interfaces, radio communication interfaces, or other communication interfaces. These network interfaces can include one or more physical interfaces (e.g., a radio, an ethernet port, a USB port, etc.) and a software stack including drivers and/or other code 1108 that is configured to communicate with the one or more physical interfaces to support one or more LAN, PAN, and/or WAN standard communication protocols. The communication protocols can include, for example, TCP and UDP among others. As such, the network interfaces enable the computing device 1100 to access and communicate with other computing devices via a computer network.

The interfaces 1104 can include user interfaces. For instance, in some examples, the user interfaces include user input and/or output devices (e.g., a keyboard, a mouse, a touchscreen, a display, a speaker, a camera, an accelerometer, a biometric scanner, an environmental sensor, etc.) and a software stack including drivers and/or other code 1108 that is configured to communicate with the user input and/or output devices. As such, the user interfaces enable the computing device 1100 to interact with users to receive input and/or render output. This rendered output can include, for instance, one or more GUIs including one or more controls configured to display output and/or receive input. The input can specify values to be stored in the data store 1110. The output can indicate values stored in the data store 1110.

Continuing with the example of FIG. 11, the various features of the computing device 1100 described above can communicate with one another via the interconnection mechanism 1112. In some examples, the interconnection mechanism 1112 includes a communications bus.

Various inventive concepts may be embodied as one or more methods, of which examples have been provided. The acts performed as part of a method may be ordered in any suitable way. Accordingly, examples may be constructed in which acts are performed in an order different than illustrated, which may include performing some acts simultaneously, even though shown as sequential acts in illustrative examples.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Example 1 is a system comprising: an application executable on a user device to operate a door lock and to initiate calibration of the door lock remotely in response to input received on a user interface of the application presented on a display of the user device; a remote computing environment in communication with the user device, the remote computing environment configured to exchange data with the user device to calibrate the door lock; and a base station in communication with the remote computing environment, the base station configured to initiate calibration of the door lock and notify the remote computing environment of a calibration status.

In Example 2, the subject matter of Example 1 includes wherein the data further includes a lock identifier identifying the door lock.

In Example 3, the subject matter of Example 2 includes wherein: the remote computing environment forwards the lock identifier to the base station; and the base station identifies the door lock based on the lock identifier and instructs the door lock to initiate the calibration of the door lock.

In Example 4, the subject matter of Examples 1-3 includes wherein the remote computing environment determines a timing for calibration of the door lock based on a schedule and, in response, causes a prompt to be displayed on the display of the user device.

In Example 5, the subject matter of Examples 1~4 includes the remote computing environment configured to: receive a request to calibrate the door lock from the application; and send an instruction to the base station in response to the request to calibrate the door lock.

In Example 6, the subject matter of Example 5 includes wherein the base station initiates the calibration of the door lock in response to receiving the instruction from the remote computing environment.

In Example 7, the subject matter of Examples 1-6 includes wherein the user device includes a mobile electronic device.

In Example 8, the subject matter of Examples 1-7 includes the remote computing environment being at a different location than at least one of the user device and the door lock.

In Example 9, the subject matter of Examples 6-8 includes wherein: the base station includes a wireless radio frequency communication radio; and the base station sends a calibration initiation instruction via the wireless radio frequency communication radio to the door lock.

In Example 10, the subject matter of Examples 1-9 includes wherein: the remote computing environment exchanges the data with the user device via a first communication link; the base station communicates with the remote computing environment via a second communication link different from the first communication link; and the base station communicates with the door lock via a wireless radio frequency communication link.

In Example 11, the subject matter of Example 10 includes wherein the first communication link includes a cellular network connection between the user device and the remote computing environment.

In Example 12, the subject matter of Examples 1-11 includes the base station configured to: receive a current status of calibration from the door lock; and update a status of calibration for the door lock based on the current status received.

In Example 13, the subject matter of Examples 1-12 includes the remote computing environment configured to: receive a confirmation of calibration of the door lock from the base station; and in response to receiving the confirmation, send a notification to the application, the notification causing a verification prompt to appear on the user interface of the user device.

In Example 14, the subject matter of Example 13 includes the remote computing environment configured to: receive an indication of incomplete calibration from the application; and cause the base station to reinitiate the calibration of the door lock.

Example 15 is a non-transitory computer-readable medium storing instructions that, when executed by a processor of a user device, cause the user device to: generate a request to calibrate a door lock in response to a user input received via a user interface; and transmit the request to calibrate the door lock indirectly to the door lock via a remote computing environment and a base station in communication with the door lock, the request to calibrate the door lock causing the door lock to initiate calibration of the door lock.

In Example 16, the subject matter of Example 15 includes the instructions further causing the user device to: retrieve a current status of calibration of a door lock at a user device from a remote computing environment; and display an alert via a user interface of the user device based on the current status of calibration, the alert to notify a user to calibrate the door lock; wherein the user input received via the user interface is responsive to the display of the alert via the user interface.

In Example 17, the subject matter of Example 16 includes wherein the request to calibrate the door lock comprises at least one of an identifier for the door lock or an identifier for the base station.

In Example 18, the subject matter of Examples 16-17 includes wherein: the remote computing environment forwards an identifier for the door lock and the request to calibrate the door lock to the base station; and the base station identifies the door lock based on the identifier for the door lock and instruct the door lock to initiate the calibration of the door lock.

In Example 19, the subject matter of Examples 16-18 includes wherein retrieving the current status of calibration from the remote computing environment comprises receiving the current status of calibration from the remote computing environment based on a timing for calibration of the door lock based on a schedule.

Example 20 is a computing device comprising: a memory; and a processor coupled to the memory and configured to execute instructions to: receive a request from a remote computing environment to initiate calibration of a door lock, the request including an identifier of the door lock; transmit a signal to the door lock based on the identifier, the signal to initiate calibration of the door lock; receive a return signal from the door lock indicative of a status of calibration of the door lock; and provide a message indicative of the status of calibration via the remote computing environment to a user device remote from the door lock to confirm calibration of the door lock.

In Example 21, the subject matter of Example 20 includes the processor to execute instructions to: receive an indication of incomplete calibration from the user device via the remote computing environment; and transmit a recalibration signal to the door lock, the signal to reinitiate the calibration of the door lock.

In Example 22, the subject matter of Examples 20-21 includes the processor configured to execute instructions to: receive a current status of calibration from the door lock; and update a status of calibration for the door lock based on the current status received.

In Example 23, the subject matter of Examples 20-22 includes the processor configured to execute instructions to: receive an indication of incomplete calibration from the user device via the remote computing environment; and transmit a recalibration signal to the door lock, the signal to reinitiate the calibration of the door lock.

In Example 24, the subject matter of Examples 20-23 includes a wireless radio frequency communication radio, the processor configured to execute instructions to transmit the signal via the wireless radio frequency communication radio to the door lock.

In Example 25, the subject matter of Example 24 includes a network communication interface, the processor configured to execute instructions to receive the request from the remote computing environment via the network communication interface.

Example 26 is at least one machine-readable medium including instructions that, when executed by processing circuitry, cause the processing circuitry to perform operations to implement of any of Examples 1-25.

Example 27 is an apparatus comprising means to implement of any of Examples 1-25. Example 28 is a system to implement of any of Examples 1-25.

Example 29 is a method to implement of any of Examples 1-25.

Having described several examples in detail, various modifications and improvements will readily occur to those skilled in the art. Such modifications and improvements are intended to be within the scope of this disclosure. Accordingly, the foregoing description is by way of example only, and is not intended as limiting.

What is claimed is:

1. A system, comprising:
   an application executable on a user device, the application being configured to generate a request to initiate calibration of a lock for a door of a building in response to an input received via a user interface of the application;
   a computing environment remote from the building, the computing environment being configured to generate an instruction to initiate calibration of the lock in response to receipt of the request from the application; and
   a base station configured to initiate calibration of the lock in response to receipt of the instruction from the computing environment;
   wherein the computing environment is further configured to:
      receive a confirmation of calibration of the lock from the base station,
      in response to receiving the confirmation, send a notification to the application, the notification causing a verification prompt to appear on the user interface of the user device,
      receive an indication of incomplete calibration from the application, and cause the base station to reinitiate the calibration of the lock.

2. The system of claim 1, wherein the request further includes a lock identifier identifying the lock.

3. The system of claim 2, wherein:
   the computing environment is further configured to send the lock identifier to the base station; and
   the base station is further configured to identify the lock based on the lock identifier and instruct the lock to initiate a calibration operation.

4. The system of claim 1, wherein the computing environment is further configured to determine a timing for calibration of the lock based on a schedule and, in response, cause a prompt to be presented on a display of the user device.

5. The system of claim 1, wherein:
   the base station includes a wireless radio frequency communication radio; and
   the base station is further configured to send a calibration initiation instruction via the wireless radio frequency communication radio to the lock.

6. The system of claim 1, wherein the base station is located within the building.

7. The system of claim 1, wherein the base station is remote from the lock and is further configured to send a command to the lock to initiate the calibration of the lock.

8. The system of claim 1, wherein the application is further configured to operate the lock in response to another input received via the user interface.

9. The system of claim 1, wherein:
   the application is further configured to send the request to the computing environment via a wide area network; and
   the computing environment is further configured to send the instruction to the base station via the wide area network.

10. A method, comprising:
    generating, by an application executing on a user device, a request to calibrate a lock for a door of a building in response to a first input received via a user interface of the application;
    sending, by the application, the request to a computing environment remote from the building, the request causing the computing environment to send, to a base station, an instruction that causes the base station to initiate calibration of the lock;
    receiving, by the application and from the computing environment, a notification that causes a verification prompt to appear on the user interface of the user device, the notification having been generated by the computing environment in response to receipt of a confirmation of calibration of the lock from the base station;
    generating, by the application, an indication of incomplete calibration in response to a second input received via the user interface; and
    sending, by the application, the indication to the computing environment, the indication causing the computing environment to cause the base station to reinitiate the calibration of the lock.

11. The method of claim 10, further comprising:
    receiving, by the application and from the computing environment, a current status of calibration of the lock; and
    displaying an alert via the user interface based on the current status of calibration, the alert to notify a user to calibrate the lock;
    wherein the first input is received via the user interface after the user interface displays the alert.

12. The method of claim 10, wherein the request to calibrate the lock comprises at least one of an identifier for the lock or an identifier for the base station.

13. The method of claim 10, further comprising:
    the computing environment includes an identifier for the lock in the instruction; and
    the base station identifies the lock based on the identifier.

14. The method of claim 10, further comprising:
    in response an additional input received via the user interface of the application, sending, from the application to the computing environment, an additional request to lock or unlock the lock, the additional request causing the computing environment to send an additional instruction to the base station that causes the base station to generate a command to lock or unlock the lock.

15. A method, comprising:
    receiving, by a base station and from a computing environment remote from a building, a request to initiate calibration of a lock for a door of the building, the request including an identifier of the lock;

sending, from the base station to the lock and based on the identifier, a command to initiate calibration of the lock;

receiving, by the base station and from the lock, a first indication of a status of calibration of the lock;

sending, from the base station to the computing environment, a second indication of the status of the calibration, the second indication causing the computing environment to cause a user device to output a message indicating the status of the calibration of the lock;

receiving, by the base station and from the computing environment, an indication of incomplete calibration, the indication having been generated in response to an input to the user device; and sending, from the base station to the lock, a recalibration signal, the recalibration signal causing the lock to reinitiate a calibration operation.

16. The method of claim 15, further comprising:
using a wireless radio frequency communication radio of the base station to send the command to the lock.

17. The method of claim 15, wherein the base station is remote from the lock.

* * * * *